US009268781B2

(12) United States Patent
Akifusa et al.

(10) Patent No.: US 9,268,781 B2
(45) Date of Patent: Feb. 23, 2016

(54) COMPUTER READABLE MEDIUM RECORDING PROGRAM, INFORMATION PROCESSING DEVICE, INFORMATION PROCESSING SYSTEM, AND INFORMATION PROCESSING METHOD

(75) Inventors: Yusuke Akifusa, Kyoto (JP); Masahiro Nitta, Kyoto (JP); Kenji Matsumoto, Kyoto (JP); Tetsuya Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 192 days.

(21) Appl. No.: 13/328,225

(22) Filed: Dec. 16, 2011

(65) Prior Publication Data

US 2012/0158789 A1 Jun. 21, 2012

(30) Foreign Application Priority Data

Dec. 17, 2010 (JP) .................................. 2010-282210

(51) Int. Cl.
*G06F 17/30* (2006.01)
(52) U.S. Cl.
CPC .............................. *G06F 17/30115* (2013.01)
(58) Field of Classification Search
CPC ............... G06F 17/30961; G06F 17/30625; G06F 17/30327; G06F 17/30115
USPC ........................................................ 707/797
See application file for complete search history.

(56) References Cited

U.S. PATENT DOCUMENTS

| 8,468,244 | B2 * | 6/2013 | Redlich .................. G06Q 10/06 705/50 |
| 2005/0203916 | A1 * | 9/2005 | Hirose .................... G06Q 10/10 |
| 2006/0277203 | A1 * | 12/2006 | Uittenbogaard .. G06F 17/30418 |
| 2007/0198548 | A1 * | 8/2007 | Lee ................................. 707/100 |
| 2007/0219971 | A1 * | 9/2007 | Biermann .......... G06F 17/30607 |
| 2007/0260618 | A1 * | 11/2007 | Kawate .................. G11B 20/10 |
| 2008/0050029 | A1 * | 2/2008 | Bashyam ................ G06T 9/004 382/243 |
| 2008/0183719 | A1 * | 7/2008 | Kageyama .......... G06F 17/3089 |
| 2008/0222166 | A1 * | 9/2008 | Hultgren ........... G06F 17/30554 |
| 2009/0164516 | A1 * | 6/2009 | Svendsen et al. .......... 707/104.1 |
| 2009/0234476 | A1 * | 9/2009 | Yoshida .......................... 700/94 |
| 2010/0185700 | A1 * | 7/2010 | Bodain ............. G06F 17/30734 707/803 |
| 2010/0198805 | A1 * | 8/2010 | Choi et al. .................... 707/711 |
| 2010/0250497 | A1 * | 9/2010 | Redlich .................. F41H 13/00 707/661 |
| 2011/0022819 | A1 * | 1/2011 | Post et al. ..................... 711/207 |

FOREIGN PATENT DOCUMENTS

| JP | 2008-4217 | 1/2008 |
| JP | 2010-055665 | 3/2010 |

* cited by examiner

*Primary Examiner* — Noosha Arjomandi
(74) *Attorney, Agent, or Firm* — Nixon & Vanderhye P.C.

(57) ABSTRACT

An example computer 10 that manages folders containing files by using a tree structure is caused to execute a step S104 of identifying a superior folder from predetermined folders managed by the tree structure by retracing the tree structure by at least one level, and a step S501 of specifying a file belonging to a subordinate folder that is subordinate to the superior folder in the tree structure as a processing object.

19 Claims, 17 Drawing Sheets

*FIG. 16*

| FILE PATH | FLAG |
|---|---|
| /.../music/ARTIST B/ALBUM E/SONG 08.mp3 | TRUE |
| /.../music/ARTIST A/ALBUM B/SONG 04.mp3 | FALSE |
| /.../music/ARTIST A/ALBUM B/SONG 03.mp3 | FALSE |
| /.../music/ARTIST B/ALBUM D/SONG 06.mp3 | FALSE |
| /.../music/ARTIST B/ALBUM D/SONG 07.mp3 | FALSE |
| /.../music/ARTIST A/ALBUM A/SONG 02.mp3 | FALSE |
| /.../music/ARTIST B/ALBUM F/SONG 10.mp3 | FALSE |
| /.../music/ARTIST A/ALBUM A/SONG 01.mp3 | FALSE |
| /.../music/ARTIST A/ALBUM C/SONG 05.mp3 | FALSE |
| /.../music/ARTIST B/ALBUM E/SONG 09.mp3 | FALSE |

COMPUTER READABLE MEDIUM RECORDING PROGRAM, INFORMATION PROCESSING DEVICE, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. JP2010-282210, filed on Dec. 17, 2010, the entire contents of which are incorporated herein by reference.

FIELD

The present disclosure relates to an information processing device that manages groups of data by means of a tree structure.

BACKGROUND AND SUMMARY

Conventionally, for specifying a plurality of pieces of data related to music, video, photographs, and the like in batches as a processing object, data grouping methods are used which involve managing data with a single folder, managing data using a list such as a so-called playlist, and the like.

However, with such management methods, once data is grouped, specifying data included in a certain group together with data not belonging to the same group as processing objects requires creating a new folder or a new playlist, consequently forcing a user to perform cumbersome operations.

In addition, for specifying data as processing objects across a plurality of groups, a method is also used in which all pieces of data are set as processing objects regardless of grouping. For example, there are playback devices which allow selection of an option of specifying all existing data as playback objects when performing random playback, shuffle playback, or the like on all pieces of data including music, videos, photographs, and the like. However, these methods simply treat all pieces of data as processing objects and fail to consider attributes or similarities of data or groups.

Furthermore, for extracting processing objects with consideration for attributes and similarities of data, a method is also used in which contents and meta-information of data are referenced to automatically extract similar data as processing objects (a method commonly referred to as a smart folder, a smart playlist, a smart search, or the like). However, such a method is disadvantageous from the standpoint of resources since automatic extraction necessitate reading data into a memory (for example, by performing an operation to open a file), and problematically keeps users waiting and the like.

An example of an information processing program according to the present disclosure is a program which causes a computer that manages groups of data by means of a tree structure to execute: identifying a superior group from predetermined groups managed by the tree structure by retracing the tree structure by at least one level; and specifying data belonging to a subordinate group that is subordinate to the superior group in the tree structure as a processing object.

The present disclosure is applicable to computers that manage groups of data by means of a tree structure. Application objects of the present disclosure are not limited to computers that manage data by means of a so-called file system or a directory structure. For example, even when audio data, video data, image data, and the like are managed by a database that differs from a so-called file system, the present disclosure can be applied if a group such as a playlist that contains data is managed on the database by means of a tree structure. Therefore, even when an actual folder structure is flat, as long as there is management information that enables management by groups having a tree structure, the present disclosure can be applied and processing objects can be readily specified across groups.

In addition, according to the present disclosure, processing object data can be specified across a plurality of related groups without having to reference meta-information (for example, tag information included in a music file or an image file) or content data contained in data or, in other words, without having to perform a file opening process in which a file is extracted in a memory. However, application objects of the present disclosure are not limited to cases where meta-information and content data contained in data are not referenced. While a greater amount of resources is generally required, a superior group may be identified based on information obtained by referencing meta-information and content data. Furthermore, subordinate groups that are subordinate to a superior group refer to groups connected to the superior group on a lower level side in a tree structure. In addition to groups that are directly subordinate to the superior group (in other words, lower by one level than the superior group), subordinate groups also include groups that are indirectly subordinate to the superior group via another subordinate group (in other words, lower by two or more levels than the superior group).

Moreover, a program according to the present disclosure may cause the computer to further execute selecting data by a predetermined process, wherein in the superior group identifying, the superior group may be identified by identifying a superior group that is higher by at least one level from a group containing the data selected in the data selecting.

In addition, a program according to the present disclosure may cause the computer to further execute selecting a group by a predetermined process, wherein in the superior group identifying, the superior group may be identified by identifying a superior group that is higher by at least one level from the group selected in the group selecting.

According to the present disclosure, by selecting data or a group by a predetermined process and identifying a superior group using the data or the group as a starting point, data with high degrees of association can be preferentially included in the processing objects. Examples of the predetermined process include a process of random selection from data or groups that satisfy a predetermined condition and a process of random selection from all pieces of data or all groups.

Furthermore, in the data selecting, data may be selected by a process of selecting data from data satisfying a predetermined condition.

Moreover, in the group selecting, a group may be selected by a process of selecting a group from groups that satisfy a predetermined condition.

According to the present disclosure, by selecting data or a group from data or groups that satisfy a predetermined condition and identifying a superior group using the data or the group as a starting point, data with high degrees of association with the predetermined condition can be preferentially included in the processing objects. Examples of the predetermined condition include a frequency of use that is equal to or higher than a predetermined order and a frequency of use that is equal to or higher than a predetermined threshold. As described above, when data or a group that satisfies a predetermined condition is selected, meta-information and content data contained in the data included in the group may be referenced.

In addition, in the data selecting, data may be selected by a process of selecting data from data satisfying the predetermined condition that includes a condition regarding a frequency of use of data.

Furthermore, in the group selecting, a group may be selected by a process of selecting a group from groups satisfying the predetermined condition that includes a condition regarding a frequency of use of a group.

By selecting data or a group from data or groups satisfying the predetermined condition that includes a condition regarding a frequency of use, a processing object in accordance with a preference or a usage trend of a user can be specified.

For example, in the data selecting, data may be selected by a process of selecting data from data satisfying the predetermined condition that includes a condition requiring a frequency of use of data to be within a predetermined rank from a highest rank.

By selecting data or a group using a method of random selection from a set of data or a set of groups whose frequency of use is equal to or higher than a predetermined rank or a method of random selection from a set of data or a set of groups whose frequency of use is equal to or lower than a predetermined rank, a processing object that is more likely to be favored by a user or a processing object that is normally less likely to be used by the user can be specified.

In addition, in the data selecting, a plurality of pieces of data may be selected by a plurality of predetermined processes differing from each other; in the superior group identifying, a plurality of the superior groups may be identified for each of the plurality of pieces of data selected in the data selecting; and the computer may be caused to further execute displaying group names of the plurality of superior groups identified in the superior group identifying on a display device connected to the computer so as to be selectable by a user.

By selecting a plurality of pieces of data by a plurality of predetermined processes differing from each other and identifying a plurality of the superior groups for each of the plurality of pieces of data, processing objects contained in different superior groups can be selected. In addition, by displaying the group names of the plurality of superior groups selected in this manner so as to be selectable by the user, a range of choices available to the user can be widened.

Furthermore, in the data selecting, a plurality of pieces of data may be selected including data selected by a process of selecting data from data satisfying a predetermined condition, and data selected by a process of selecting data from all pieces of data.

By including data selected by a process of selecting data from all pieces of data in data selected in the data selecting, processing objects contained in a superior group which are unlikely to be selected when a predetermined condition is applied can be added to the choices available to the user in addition to processing objects contained in a superior group identified according to the predetermined condition.

Moreover, the program according to the present disclosure may cause the computer to further execute acquiring a frequency of use of a group by identifying a group containing each piece of data indicated in a data usage history of the computer and compiling the usage history for each identified group, wherein in the group selecting, a group may be selected by a process of selecting a group from groups satisfying the predetermined condition including a condition regarding the frequency of use of group acquired in the use frequency acquiring.

In other words, according to the present disclosure, a frequency of use of a group containing data can be acquired based on a usage history of the data, and a group to become a starting point for identifying a superior group can be selected based on the acquired frequency of use of the group.

In addition, the program according to the present disclosure may cause the computer to further execute determining whether or not there is a plurality of the subordinate groups which contains a predetermined type of data and which is subordinate to the superior group.

According to the present disclosure, by executing the determination to determine whether or not there is a plurality of groups containing data that may potentially be processing objects, a determination can be made on whether or not processing objects are specified across a plurality of groups. Whether or not data contained in a subordinate group is a predetermined type of data can be identified by, for example, referencing file type identification information managed according to extensions of file names or file management information (information including attributes or the like of managed files such as a file management table). However, methods of identifying data types are not limited to the example described above. While a greater amount of resources is generally required, a data type may be identified by opening a file and referencing meta-information or content data.

Furthermore, the program according to the present disclosure may cause the computer to change the predetermined group and re-execute the superior group identifying and the processing object specifying when it is determined in the determination that there is not a plurality of the subordinate groups.

Moreover, the program according to the present disclosure may cause the computer to further execute changing the superior group by further retracing from the superior group identified in the superior group identifying by at least one level when it is determined in the determination that there is not a plurality of the subordinate groups.

In other words, according to the present disclosure, by re-executing the superior group identifying and the processing object specifying or by changing the superior group by further retracing by at least one level, the superior group can be changed when appropriate subordinate groups are not subordinate in plurality to an identified superior group.

In addition, the present disclosure can also be viewed as an information processing device, an information processing system comprising the information processing unit, or a method executed by a computer. Furthermore, the present disclosure may be embodied by a recording of the program described above on a recording medium that is readable by a device such as a computer, a machine, or the like. In this case, a recording medium that is readable by a computer or the like refers to a recording medium which accumulates information such as data or programs by an electric action, a magnetic action, an optical action, a mechanical action, or a chemical action and which can be read by a computer or the like.

BRIEF DESCRIPTION OF THE DRAWINGS

FIG. 16 is a diagram showing an example non-limiting configuration of a playback object list according to an embodiment.

DETAILED DESCRIPTION OF NON-LIMITING EXAMPLE EMBODIMENTS

Hereinafter, example embodiments of a program, an information processing device, an information processing system, and an information processing method according to the present disclosure will be described with reference to the drawings. The example embodiments described below represent exemplary implementations of the information processing program and the like according to the present disclosure. Therefore, it is to be understood that the information processing program and the like according to the present disclosure are not limited to the specific configurations described below. When implementing the information processing program and the like according to the present disclosure, specific configurations in accordance with various embodiments may be adopted as appropriate.

Moreover, while a case will be described in the present embodiment in which the information processing program and the like according to the present disclosure are implemented as a game device that is one mode of an information processing device, the information processing program and the like according to the present disclosure can be applied to any information processing device as long as the information processing device manages groups of data by means of a tree structure. In other words, application objects of the information processing program and the like according to the present disclosure are not limited to a game device. For example, the information processing program and the like according to the present disclosure can be applied to various types of information processing devices such as a personal computer, a mobile phone terminal, a mobile audio player, a stationary audio player, and a stationary game device.

FIG. 1, FIG. 2, FIG. 3A, FIG. 3B, FIG. 3C and FIG. 3D are plan diagrams showing one example of the external appearance of a game device.

The game device 10 shown in FIG. 1 to FIG. 3D has a built-in imaging unit (camera), and is able to capture an image by means of this imaging unit, display a captured image on a screen, and save data of a captured image. Furthermore, the game device 10 is able to execute a game program stored on an exchangeable memory card, or a game program received from a sever or other game device via a network. Moreover, the game device 10 is able to generate an image captured by a virtual camera set in a virtual space, by computer graphics processing, and display the image on a screen.

Figure 1:
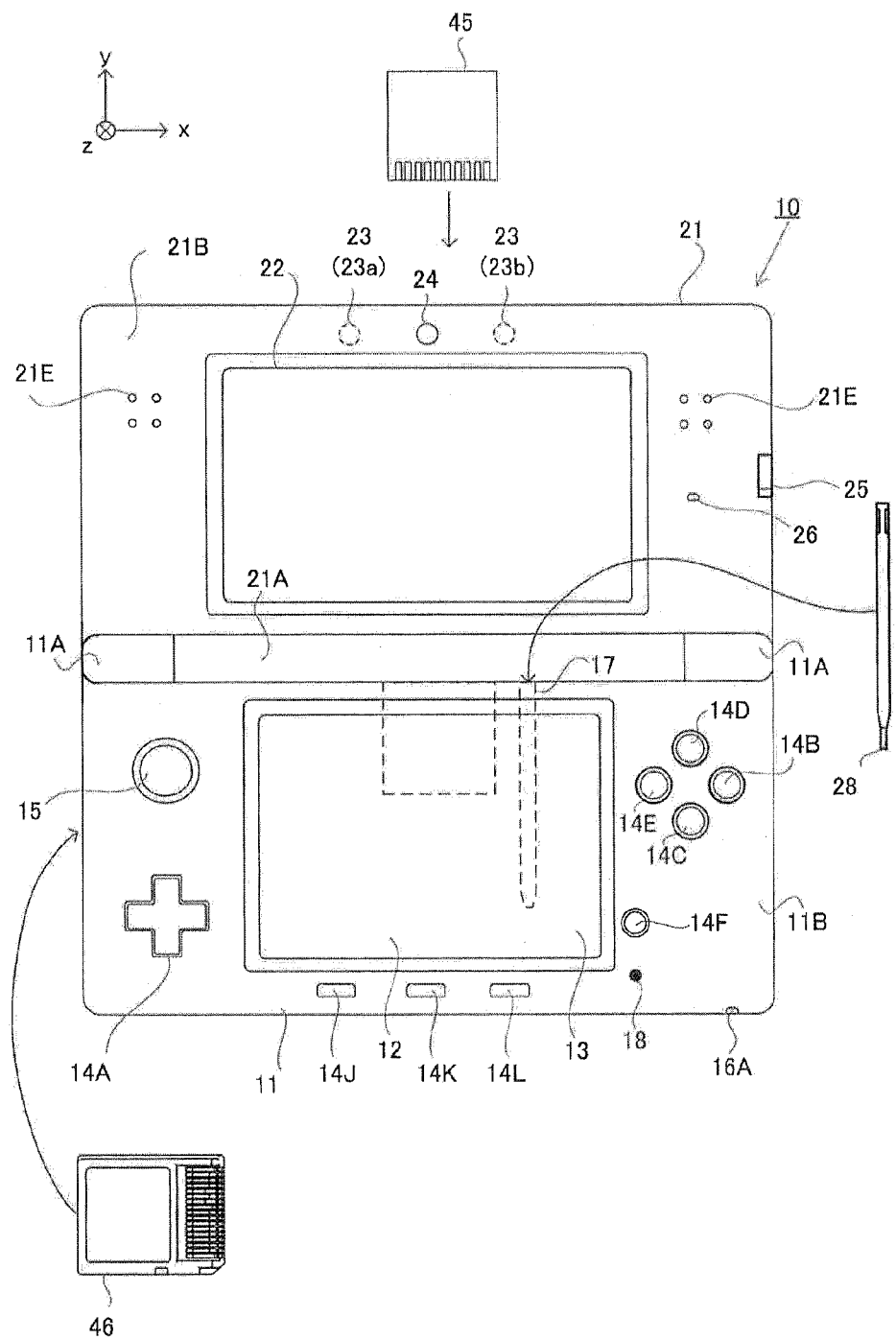
FIG. 1 is a front view diagram showing an example non-limiting game device in an opened state according to an embodiment.
Figure 2:
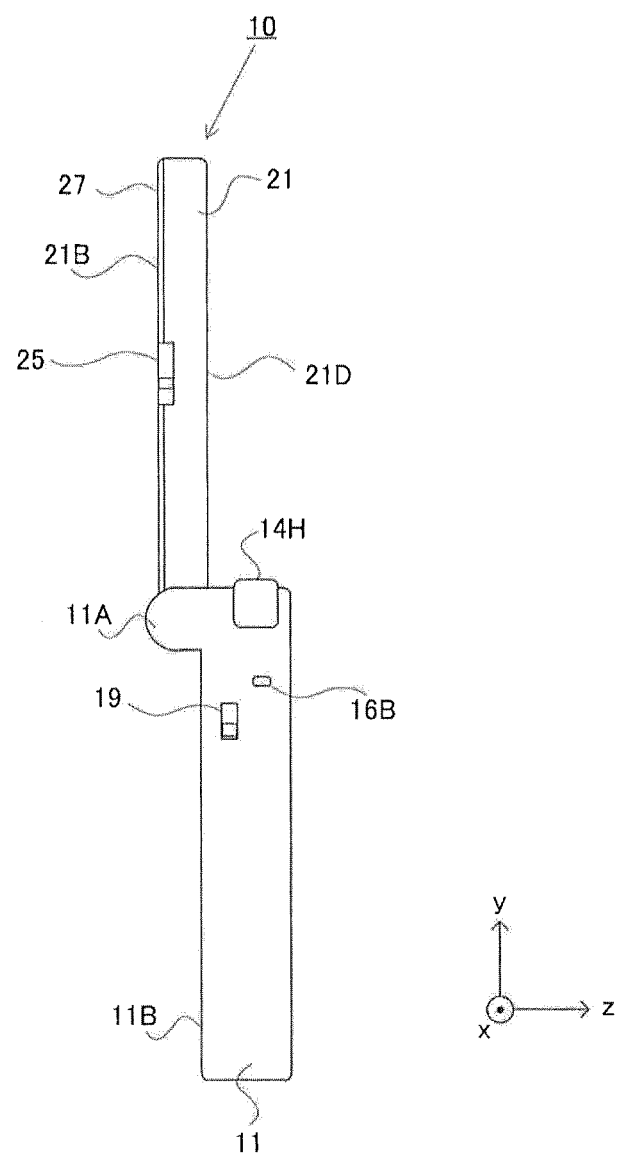
FIG. 2 is a side diagram showing an example non-limiting game device in an opened state according to an embodiment.
Figure 3:
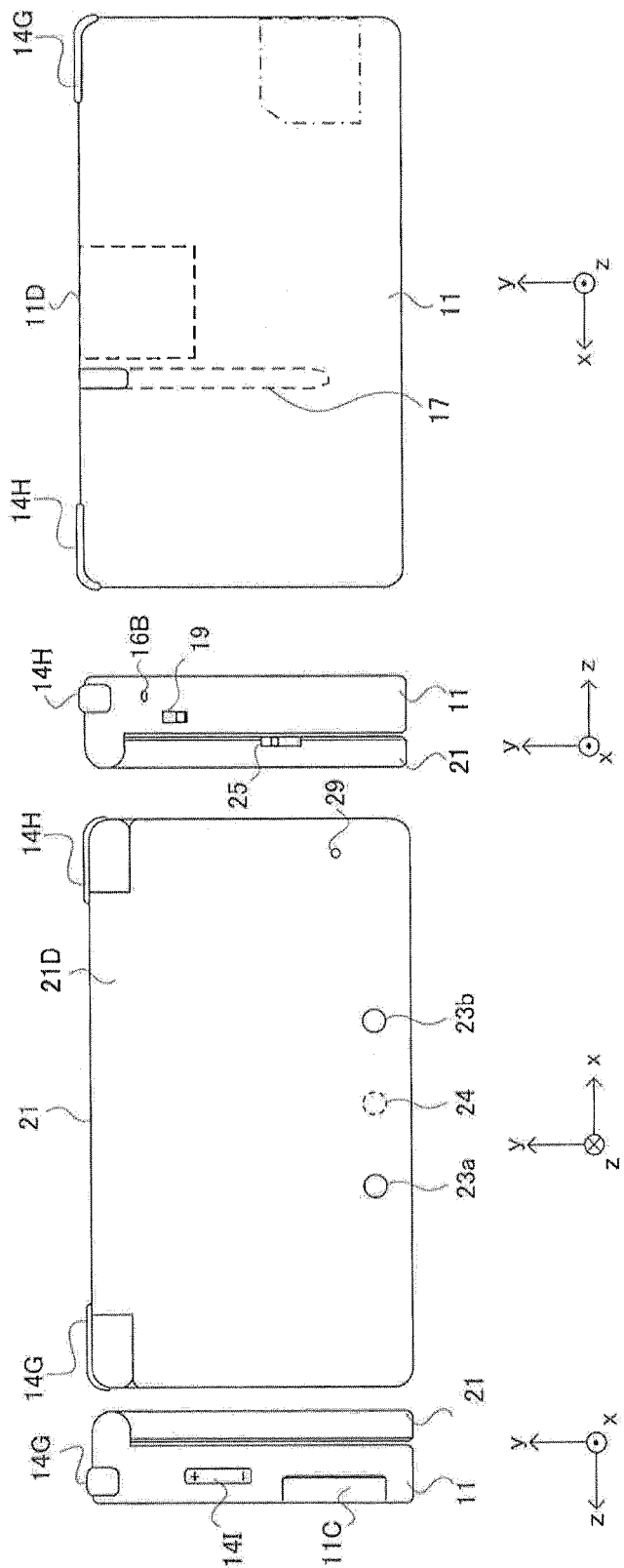
FIG. 3A is a left side diagram showing an example non-limiting game device in a closed state according to an embodiment.
FIG. 3B is a front view diagram showing an example non-limiting game device in a closed state according to an embodiment.
FIG. 3C is a right side diagram showing an example non-limiting game device in a closed state according to an embodiment.
FIG. 3D is a rear view diagram showing an example non-limiting game device in a closed state according to an embodiment.

The game device 10 shown in FIG. 1 to FIG. 3D has a lower housing 11 and an upper housing 21. The lower housing 11 and the upper housing 21 are coupled openably and closably (in a folding fashion) by means of a hinge structure. In other words, the upper housing 21 is installed rotatably (swingably) with respect to the lower housing 11. By this means, the game device 10 has two modes: a closed state where the upper housing 21 lies in close contact with the lower housing 11 (FIG. 3A and FIG. 3C), and a state (open state) where the upper housing 21 has been rotated with respect to the lower housing 11 and released from the state of close contact. As shown in FIG. 2, the upper housing 21 is allowed to rotate until reaching a position where the upper housing 21 and the lower housing 11 are substantially parallel in the open state (see FIG. 2).

FIG. 1 is a front view diagram showing one example of a game device 10 in an opened state (open state). The lower housing 11 and the upper housing 21 of the game device 10 are respectively formed in a horizontally-long rectangular plate shape having a planar shape with a long direction (horizontal direction (left/right direction): the x direction in FIG. 1) and a short direction ((vertical direction): the y direction in FIG. 1). The outer edge portion on the lower side in the lengthwise direction of the upper housing 21 and the outer edge portion on the upper side in the lengthwise direction of the lower housing 11 are coupled rotatably by means of a hinge structure. When the user uses the game device 10, the game device 10 is normally set to an open state. When the user stores the game device 10, the game device 10 is normally set to a closed state. Furthermore, the upper housing 21 can maintain a stationary state at any angle desired by the user with respect to the lower housing 11, due to a frictional force which is produced in the coupling portion with the lower housing 11. In other words, in the game device 10, the upper housing 21 can be halted at a desired angle with respect to the lower housing 11. In general, from the viewpoint of the visibility of a screen provided in the upper housing 21, the upper housing 21 is opened to a position forming a perpendicular angle or obtuse angle with respect to the lower housing 11. Below, when the game device 10 is in the closed state, the respectively opposing surfaces of the upper housing 21 and the lower housing 11 are called "inner surfaces" or "main surfaces". Furthermore, the respective surfaces of the upper housing 21 and the lower housing 11 on the opposite side to the inner surfaces (main surfaces) are called "outer surfaces".

Protrusions (bearing sections) 11A which protrude in a direction (the z direction in FIG. 1) perpendicular to the inner surface (main surface) 11B of the lower housing 11 are provided in the upper long edge portion of the lower housing 11 of the game device 10. Furthermore, a protrusion (bearing section) 21A which protrudes in a direction perpendicular to the lower surface of the upper housing 21 from this lower surface is provided in the lower long edge portion of the upper housing 21. A rotating axle (not illustrated) extending in the x direction from one protrusion 11A, through the protrusion 21A, to the other protrusion 11A is accommodated in the protrusions 11A, 21A, 11A, and the upper housing 21 is able to rotate relatively with respect to the lower housing 11 about this rotating axle. In this way, the lower housing 11 and the upper housing 21 are connected in a foldable fashion.

A lower LCD (Liquid Crystal Display) 12, a touch panel 13, operating buttons 14A to 14L, an analog stick 15, a first LED 16A and a microphone hole 18 are provided on the inner surface 11B of the lower housing 11 which is shown in FIG. 1.

The lower LCD 12 is accommodated in the lower housing 11. The planar shape of the lower LCD 12 is a horizontally-long rectangular shape, the long edge direction thereof being arranged to coincide with the lengthwise direction of the lower housing 11 (the x direction in FIG. 1). The lower LCD 12 is provided in the center of the inner surface (main surface) of the lower housing 11. The screen of the lower LCD 12 is exposed via an opening section provided in the inner surface of the lower housing 11. When the game device 10 is not in use, it is possible to prevent soiling or scratching of the screen of the lower LCD 12 by setting the game device 10 to the closed state described above. The number of pixels of the lower LCD 12 is 320 dot×240 dot (horizontal×vertical), for instance. The lower LCD 12 is a display device which displays images in a planar view (not a stereoscopic view), in contrast to the upper LCD 22 which is described below. In the present embodiment, an LCD is used as a display device, but it is also possible to use another display device, such as one using EL (Electro Luminescence), for example. Moreover, for the lower LCD 12, it is possible to use a display device having a desired resolution.

The touch panel 13 is one of input devices of the game device 10. The touch panel 13 is installed so as to cover the screen of the lower LCD 12. In the present embodiment, the touch panel 13 employs a resistance film type of touch panel. However, the touch panel 13 is not limited to a resistance film type and it is also possible to use a touch panel based on any press operation method, such as an electrostatic capacitance method, or the like. Furthermore, in the present embodiment, the touch panel 13 is employed, which has the same resolution (detection accuracy) as the resolution of the lower LCD 12. Here, it is not especially necessary for the resolution of the touch panel 13 and the resolution of the lower LCD 12 to be matching.

The operating buttons 14A to 14L are input devices for performing predetermined inputs. Among the operation buttons 14A to 14L, a four-way button 14A (direction input button 14A), a button 14B, a button 14C, a button 14D, a button 14E, a power button 14F, a select button 14J, a home button 14K and a start button 14L are provided on the inner surface (main surface) of lower housing 11.

The four-way button 14A has a cross shape and includes at least buttons indicating upward, downward, leftward and rightward directions. The four-way button 14A is provided in the lower part of the region to the left-hand side of the lower LCD 12. The four-way button 14A is located in a position where it can be operated by the thumb of a user's left hand when gripping the lower housing 11.

The four buttons, button 14B, button 14C, button 14D and button 14E, are situated in a cross shape in the upper part of the region to the right-hand side of the lower LCD 12. The button 14B, button 14C, button 14D and button 14E are situated in a place where the thumb of a user's right hand is naturally positioned when gripping the lower housing 11. The power button 14F is situated in the lower part of the region to the right-hand side of the lower LCD 12.

The select button 14J, the home button 14K and the start button 14L are respectively situated in the region below the lower LCD 12.

The buttons 14A to 14E, the select button 14J, the home button 14K and the start button 14L are assigned appropriately to functions corresponding to a program which is executed by the game device 10. For example, the four-way button 14A is used for selection operations and character movement operations during a game, and the like. The operating buttons 14B to 14E, for example, are used for a setting operation or a canceling operation, or the like. Furthermore, the power button 14F is used to switch the power supply of the game device 10 on and off.

The analog stick 15 is a device for indicating directions. The analog stick 15 is provided in the upper part of the region to the left-hand side of the lower LCD 12 on the inner surface (main surface) of the lower housing 11. More specifically, the analog stick 15 is provided above the four-way button 14A. Moreover, the analog stick 15 is located in a position where it can be operated by the thumb of a user's left hand when gripping the lower housing 11. By providing the analog stick 15 in the upper part, the analog stick 15 is situated in a place where the thumb of a user's left hand is naturally positioned when gripping the lower housing 11. The four-way button 14A is situated in a position slightly below the thumb of the user's left hand when gripping the lower housing 11. Therefore, the user is able to operate the analog stick 15 and the four-way button 14A simply by moving his or her left thumb up or down while gripping the lower housing 11. The analog stick 15 is composed in such a manner that the top of the key slides in parallel with the inner surface of the lower housing 11. The analog stick 15 functions in accordance with the program being executed by the game device 10. For example, when a game in which a predetermined object appears in a three-dimensional virtual space is executed by the game device 10, the analog stick 15 functions as an input device for moving the predetermined object within the three-dimensional virtual space. In this case, the predetermined object is moved in the direction in which the key top of the analog stick 15 is slid. For the analog stick 15, it is possible to use a stick capable of producing an analog input by tilting by a predetermined amount in any one of the upward, downward, leftward or rightward directions or an oblique direction.

The four buttons, button 14B, button 14C, button 14D and button 14E, and the analog stick 15 are disposed in laterally symmetrical positions on either side of the lower LCD 12. By this means, depending on the game program, a left-handed person, for example, is able to input a direction instruction by using the four buttons, button 14B, button 14C, button 14D and button 14E.

The first LED 16A (FIG. 1) notifies the user of the power on/off state of the game device 10. The first LED 16A is provided on the right-hand side of the edge portion common to the inner surface (main surface) of the lower housing 11 and the lower side face of the lower housing 11. By this means, the user is able to see whether or not the first LED 16A is lit, regardless of the open and closed state of the game device 10.

The microphone hole 18 is a hole for a microphone which is built into the game device 10 as a voice input device. The built-in microphone detects external sounds via the microphone hole 18. The microphone and the microphone hole 18 are provided below the power button 14F on the inner surface (main surface) of the lower housing 11.

An insertion hole 17 for a touch pen 28 (indicated by dotted lines in FIG. 1 and FIG. 3D) is provided in the upper side face of the lower housing 11. The touch pen 28 used for performing operations on the touch panel 13 can be accommodated via the insertion hole 17. Inputs via the touch panel 13 are usually performed using the touch pen 28. However, the user may also use his or her finger, instead of the touch pen 28.

The game device 10 and an insertion hole 11D (indicated by a dotted line in FIG. 1 and FIG. 3D) for inserting an external memory 45 on which a game program is recorded are provided in the upper side face of the lower housing 11. A connector (not illustrated) for electrically connecting the external memory 45 and an internal circuit in a detachable fashion is provided inside the insertion hole 11D. By connecting the external memory 45 to the game device 10, a predetermined game program is executed by a processor included in the internal circuit. The connector and the insertion hole 11D may be provided in another side face (for example, the right-hand side face) of the lower housing 11.

Speaker holes 21E, an upper LCD 22, an inside imaging unit 24, a 3D adjustment switch 25, and a 3D indicator 26 are provided on the inner surface 21B of the upper housing 21 shown in FIG. 1.

The upper LCD 22 is a display device which is capable of displaying stereoscopically viewable images. The upper LCD 22 is capable of displaying a left-eye image and a right-eye image using substantially the same display region. More specifically, the upper LCD 22 is a display device based on a method in which a left-eye image and a right-eye image are displayed alternately in predetermined units (for example, one column each) in the horizontal direction. The upper LCD 22 may also be a display device based on a method in which a left-eye image and a right-eye image are displayed alternately. Furthermore, the upper LCD 22 is a display device producing a display which can be viewed stereoscopically with the naked eye. In this case, the upper LCD 22 employs a lenticular method or parallax barrier method in such a manner that a left-eye image and a right-eye image which are displayed alternatively in the horizontal direction are viewed separately by the left eye and the right eye, respectively. In the present embodiment, the upper LCD 22 is a display device based on a parallax barrier method. The upper LCD 22 displays an image (stereoscopic image) which can be viewed stereoscopically with the naked eye, by using a left-eye image and a right-eye image. More specifically, the upper LCD 22 is able to display a stereo image (a stereoscopically viewable image) which creates a three-dimensional impression for the user, by causing the left-eye image and the right-eye image to be viewed respectively by the user's left eye and the user's right eye, by means of a parallax barrier. Furthermore, in the upper LCD 22, the parallax barrier can be disabled, and when the parallax barrier is disabled, an image can be displayed in planar view (the opposite of the stereoscopic view described above; in other words, a display mode in which the same displayed image is viewed by both the right eye and the left eye). In this way, the upper LCD 22 is a display device capable of switching between a stereoscopic display mode which displays stereoscopically viewable image and a planar display mode which displays an image in planar view (displays a planar image). This switching of the display mode is performed by means of a 3D adjustment switch 25, which is described below.

The upper LCD 22 is accommodated in the upper housing 21. The upper LCD 22 is a horizontally long rectangular shape, and is arranged in the center of the upper housing 21 with the long edge direction coinciding with the long edge direction of the upper housing 21. The surface area of the screen of the upper LCD 22 is set to be larger than the surface area of the screen of the lower LCD 12, for example. More specifically, the screen of the upper LCD 22 is set to have a greater horizontal length than the screen of the lower LCD 12. More specifically, the ratio of the horizontal width in the aspect ratio of the screen in the upper LCD 22 is set to be greater than the ratio of the horizontal width in the aspect ratio of the screen in the lower LCD 12.

The screen of the upper LCD 22 is provided on the inner surface (main surface) 21B of the upper housing 21, and the screen of the upper LCD 22 is exposed via an opening section provided in the inner surface 21B of the upper housing 21. Furthermore, the inner surface of the upper housing 21 is covered with a transparent screen cover 27. The screen cover 27 protects the screen of the upper LCD 22 and is also integrated with the upper LCD 22 and the inner surface of the upper housing 21 so as to create a unified impression. The number of pixels of the upper LCD 22 is 800 dot×240 dot (horizontal×vertical), for instance. In the present embodiment, the upper LCD 22 is described as being a liquid crystal device. However, it is not limited to this and a display device using EL, or the like, for example, may also be used. Furthermore, it is possible to use a display device of any resolution for the upper LCD 22.

The speaker holes 21E are holes for outputting sound from a speaker 44 which is a sound output device of the game device 10. The speaker holes 21E are disposed in lateral symmetry on either side of the upper LCD. Sound from speakers 44, which are described below, is output via the speaker holes 21E.

The inside imaging unit 24 is an imaging unit having an imaging direction in an inward normal direction to the inner surface 21B of the upper housing 21. The inside imaging unit 24 includes an imaging element having a predetermined resolution and a lens. The imaging element is, for example, a CCD image sensor, a CMOS image sensor, or the like. The lens may include a zoom mechanism.

The inside imaging unit 24 is disposed above the upper end of the screen of the upper LCD 22 on the inner surface 21B of the upper housing 21, in a central position in the left/right direction of the upper housing 21 (on a line which divides the upper housing 21 (the screen of the upper LCD 22) into two equal parts in the left/right direction). By arranging the inside imaging unit 24 in this way, it is possible to capture an image of the user's face from the front side with the inside imaging unit 24, when the user is looking straight at the upper LCD 22. An outside left imaging unit 23a and an outside right imaging unit 23b are described below.

The 3D adjustment switch 25 is a sliding switch, which is used to switch the display mode of the upper LCD 22, as described previously. Furthermore, the 3D adjustment switch 25 is used to adjust the three-dimensional impression of the stereoscopically viewable image (stereo image) displayed on the upper LCD 22. The 3D adjustment switch 25 is provided in the edge portion of the upper housing 21 which is common to the inner surface 21B and the right side face, so as to be visible by the user regardless of the open and closed state of the game device 10. The 3D adjustment switch 25 has a slider which can be slid to any position in a predetermined direction (for example, the up/down direction), the display mode of the upper LCD 22 being set in accordance with the position of the slider.

For example, if the slider of the 3D adjustment switch 25 is situated in the lowest position, then the upper LCD 22 is set to planar display mode, and a planar image is displayed on the screen of the upper LCD 22. It is also possible to provide a planar display by leaving the upper LCD 22 in the stereoscopic display mode and using the same image for the left-eye image and the right-eye image. On the other hand, if the slider is situated to the upper side of the lowest position described above, then the upper LCD 22 is set to stereoscopic display mode. In this case, a stereoscopically viewable image is displayed on the screen of the upper LCD 22. Here, if the slider is situated above the lowest position, then the appearance of the stereo image is adjusted in accordance with the position of the slider. More specifically, the amount of displacement of the lateral direction positions of the right-eye image and the left-eye image is adjusted in accordance with the position of the slider.

The 3D indicator 26 indicates whether the upper LCD 22 is in stereoscopic display mode. For example, the 3D indicator 26 is an LED, which lights up when the stereoscopic display mode of the upper LCD 22 is enabled. The 3D indicator 26 is provided on the inner surface 21B of the upper housing 21, and in the vicinity of the screen of the upper LCD 22. Consequently, if the user is looking straight at the screen of the upper LCD 22, the user is able to see the 3D indicator 26 easily. Therefore, the user is able readily to identify the display mode of the upper LCD 22, even while looking at the screen of the upper LCD 22.

FIG. 2 is a front right side diagram showing one example of the game device 10 in an open state. A second LED 16B, a wireless switch 19 and an R button 14H are provided in the right side face of the lower housing 11. By lighting up, the second LED 16B notifies the user of the established status of wireless communication of the game device 10. The game device 10 is able to perform wireless communication with other devices, and the second LED 16B lights up when wireless communication with another device has been established. The game device 10 has a function of connecting to a wireless LAN by a method conforming to the IEEE 802.11 b/g standard, for example. The wireless switch 19 enables or disables the wireless communication function. The R button 14H is described below.

FIG. 3A is a left side diagram showing one example of a game device 10 in a closed state. An openable cover section 11C, an L button 14G and a volume button 14I are provided on the left side face of the lower housing 11 shown in FIG. 3A. The volume button 14I is a button for adjusting the volume of the speakers 44 provided in the game device 10.

A connector (not illustrated) for electrically connecting the game device 10 with an external data memory 46 (see FIG. 1) is provided on the inside of the cover section 11C. The external data memory 46 is installed detachably in the connector. The external data memory 46 is used, for example, to store (save) data of images captured by the game device 10. The connector and the cover section 11C may also be provided on the right side face of the lower housing 11. The L button 14G is described below.

FIG. 3B is a front view diagram showing one example of the game device 10 in a closed state. An outside left imaging unit 23a, an outside right imaging unit 23b and a third LED 29 are provided in the outer surface of the upper housing 21 shown in FIG. 3B.

The outside left imaging unit 23a and the outside right imaging unit 23b respectively include an imaging element having a predetermined common resolution (for example, a CCD image sensor or a CMOS image sensor, or the like), and a lens. The lens may include a zoom mechanism. The imaging direction of both the outside left imaging unit 23a and the outside right imaging unit 23b is an outward normal direction from the outer surface 21D. In other words, the imaging direction (visual axis of the camera) of the outside left imaging unit 23a and the imaging direction of the outside right imaging unit 23b are mutually parallel. The outside left imaging unit 23a and the outside right imaging unit 23b are referred to jointly below as the outside imaging unit 23.

The outside left imaging unit 23a and the outside right imaging unit 23b which constitute the outside imaging unit 23 are arranged in line in the horizontal direction of the screen of the upper LCD 22. In other words, the outside left imaging unit 23a and the outside right imaging unit 23b are arranged in such a manner that a straight line linking the outside left imaging unit 23a and the outside right imaging unit 23b lies in the horizontal direction of the screen of the upper LCD 22. Furthermore, if the user turns the upper housing 21 to a predetermined angle (for example, 90°) with respect to the lower housing 11 and views the screen of the upper LCD 22 from the front, then the outside left imaging unit 23a is positioned on the left-hand side of the user viewing the screen and the outside right imaging unit 23b is positioned on the right-hand side of the user viewing the screen (see. FIG. 1). The distance between the outside left imaging unit 23a and the outside right imaging unit 23b is set to approximately the distance between a person's eyes, for example, this distance may be set in the range of 30 mm to 70 mm. However, the distance between the outside left imaging unit 23a and the outside right imaging unit 23b is not limited to this range. In the present embodiment, the outside left imaging unit 23a and the outside right imaging unit 23b are fixed to the upper housing 21 and the imaging direction thereof cannot be changed.

The outside left imaging unit 23a and the outside right imaging unit 23b are respectively disposed in symmetrical positions with respect to a line dividing the upper LCD 22 (upper housing 21) into two equal parts in the left/right direction. Furthermore, the outside left imaging unit 23a and the outside right imaging unit 23b are disposed in the upper part of the upper housing 21 on the rear side of positions above the upper end of the screen of the upper LCD 22, when the upper housing 21 is open (see FIG. 1). In other words, the outside left imaging unit 23a and the outside right imaging unit 23b are disposed on the outer surface of the upper housing 21, above the upper end of the screen of the upper LCD 22 when the upper LCD 22 is projected to a position on the outer surface.

In this way, by arranging the outside left imaging unit 23a and the outside right imaging unit 23b in linear symmetry with respect to the central line in the short edge direction of the upper LCD 22, the respective imaging directions of the outside imaging unit 23 can be made to coincide with the respective lines of sight of the user's left and right eyes, when the user is looking straight at the upper LCD 22. Furthermore, because the outside imaging unit 23 is disposed in a rear side position above the upper end of the screen of the upper LCD 22, then there is no interference between the outside imaging unit 23 and the upper LCD 22 inside the upper housing 21. Moreover, the outside left imaging unit 23a and the outside right imaging unit 23b are provided in lateral symmetry on either side of the projected position of the inside imaging unit 24, when the inside imaging unit 24, which is provided on the inner surface of the upper housing 21, is projected to the outer surface of the upper housing 21, as indicated by the dotted line in FIG. 3B. Consequently, it is possible to make the upper housing 21 thinner compared to a case where the outside imaging unit 23 is disposed to the rear side of the screen of the upper LCD 22 or a case where the outside imaging unit 23 is disposed to the rear side of the inside imaging unit 24.

The outside left imaging unit 23a and the outside right imaging unit 23b can be used as stereo cameras by the program executed by the game device 10. Furthermore, either one of the two outside imaging elements (the outside left imaging unit 23a and the outside right imaging unit 23b) can be used independently depending on the program, allowing the outside imaging unit 23 to be used as a non-stereo camera. If executing a program which uses the outside imaging units 23a and 23b as stereo cameras, the outside left imaging unit 23a captures a left-eye image which is seen by the user's left eye and the outside right imaging unit 23b captures a right-eye image which is seen by the user's right eye. Furthermore, the program can also synthesize images captured by the two outside imaging units (the outside left imaging unit 23a and the outside right imaging unit 23b), or use the images in complementary fashion to perform imaging in an expanded imaging range. Moreover, it is also possible to generate a left-eye image and a right-eye image having parallax, from a single image captured by one of the outside imaging units 23a and 23b, so as to produce a pseudo-stereo image just like one captured by two cameras. In generating a pseudo-stereo image of this kind, the distance between the virtual cameras can be set as desired.

The third LED 29 lights up when the outside imaging unit 23 is operating, thereby indicating that the outside imaging unit 23 is operating. The third LED 29 is provided in the vicinity of the outside imaging unit 23 on the outer surface of the upper housing 21.

FIG. 3C is a right side diagram showing one example of the game device 10 in a closed state. FIG. 3D is a rear view diagram showing one example of the game device 10 in a closed state.

An L button 14G and an R button 14H are provided on the upper surface of the lower housing 11 shown in FIG. 3D. The L button 14G is provided in the left end portion of the upper surface of the lower housing 11 and the R button 14H is provided in the right end portion of the upper surface of the lower housing 11. The L button 14G and the R button 14H are assigned to appropriate functions corresponding to the program executed by the game device 10. For example, the L button 14G and the R button 14H function as shutter buttons (imaging instruction buttons) for the respective imaging units described above.

Although not shown in the drawings, a rechargeable battery forming a power source for the game device 10 is accommodated in the lower housing 11, and this battery can be recharged via a terminal provided in a side face (for example, the upper side face) of the lower housing 11.

Figure 4:
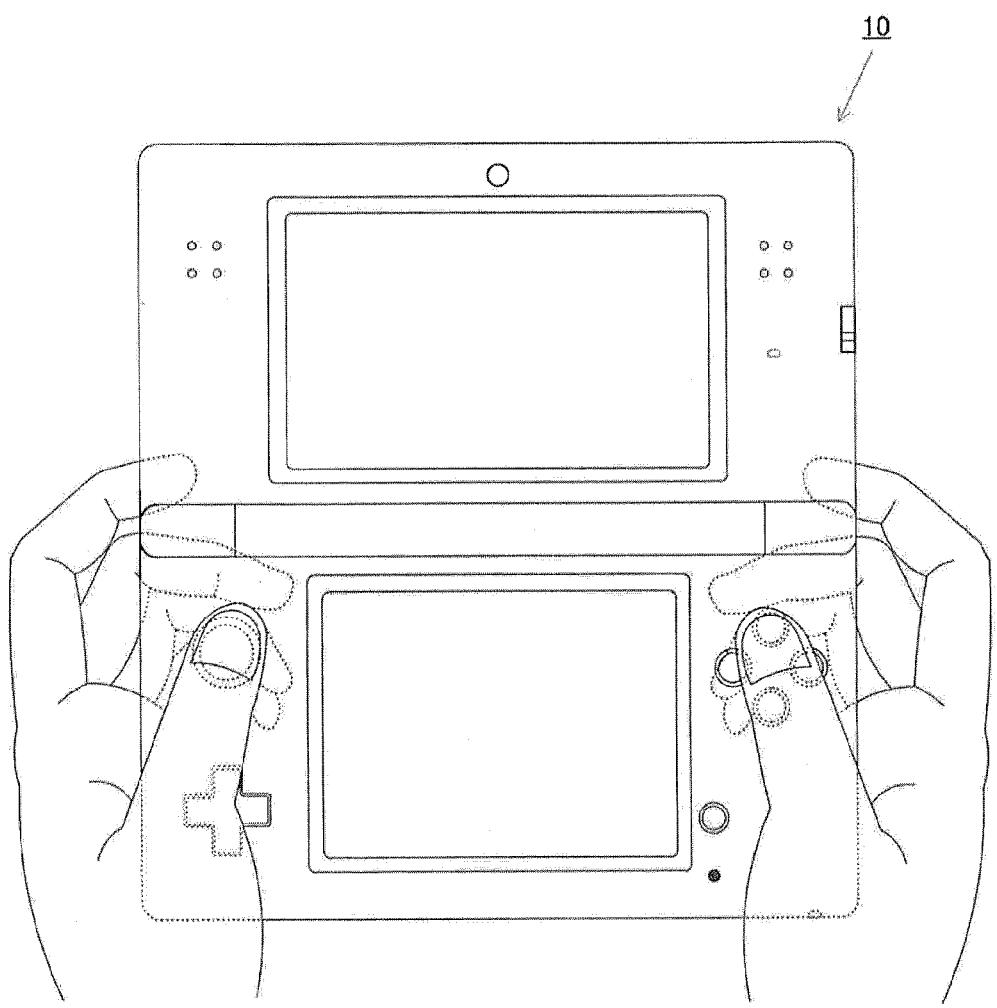
FIG. 4 is a diagram showing an example non-limiting situation where a user is gripping a game device with both hands according to an embodiment.
Figure 5:
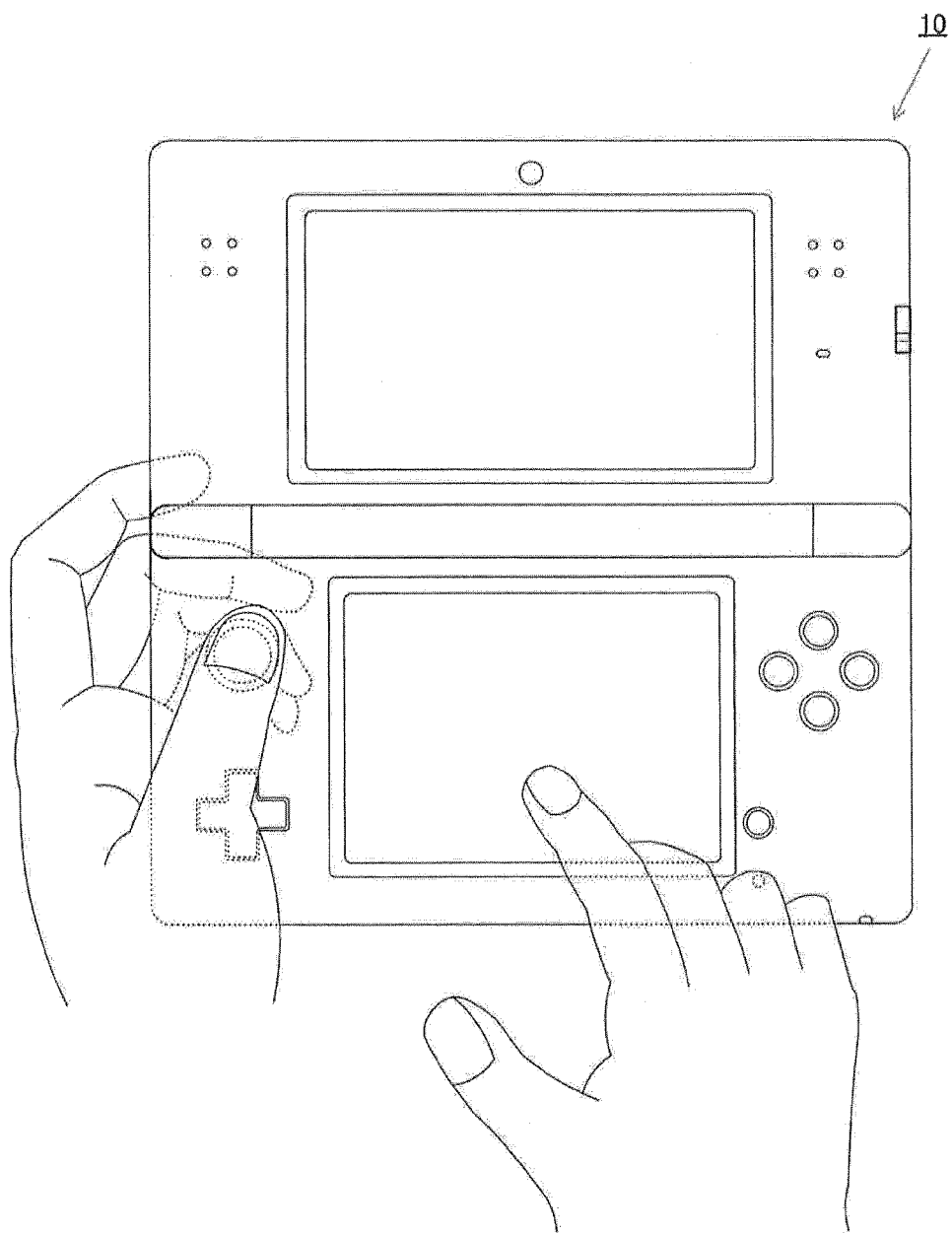
FIG. 5 is a diagram showing an example non-limiting situation where a user is gripping a game device with one hand according to an embodiment.

FIG. 4 and FIG. 5 respectively show one example of the state of use of the game device 10. FIG. 4 is a diagram showing one example of a situation where a user is gripping the game device 10 with both hands.

In the example shown in FIG. 4, the user grips the inner surface and the outer surface (the surface on the opposite side to the inner surface) of the lower housing 11 with the palm, middle finger, fourth finger and little finger of each hand, with the lower LCD 12 and the upper LCD 22 facing towards the user. By gripping the device in this way, the user is able to operate the operating buttons 14A to 14E and the analog stick 15 with his or her left and right thumbs and operate the L button 14G and the R button 14H with his or her left and right index fingers, while gripping the lower housing 11.

FIG. 5 is a diagram showing one example of a situation where a user is gripping the game device 10 with one hand. In the example shown in FIG. 5, when making an input to the touch panel 13, the user releases one of the hands gripping the lower housing 11 and grips the lower housing 11 with the other hand only. By this means, the user is able to make inputs to the touch panel 13 with the released hand.

Figure 6:
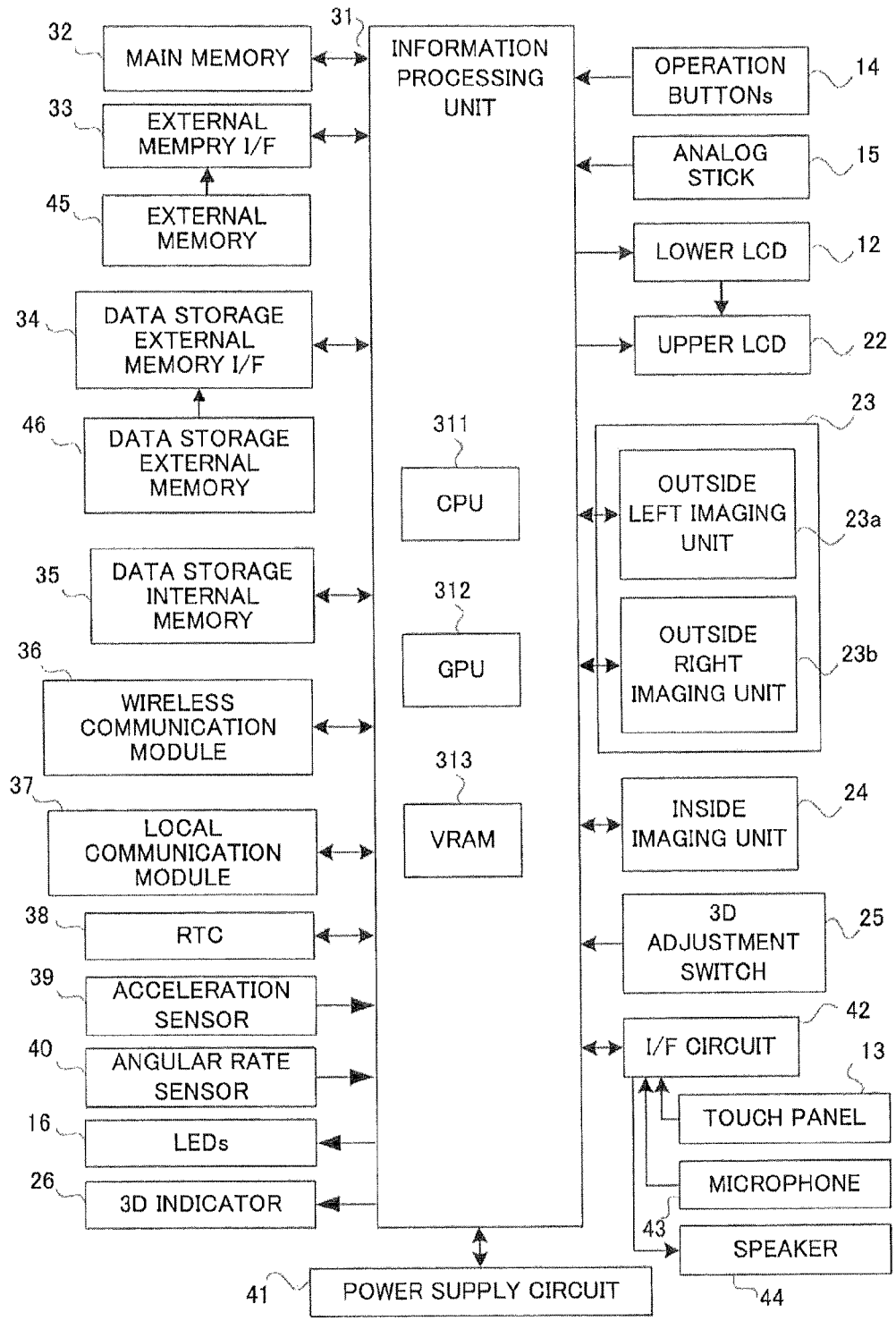
FIG. 6 is a block diagram showing an example non-limiting internal composition of a game device according to an embodiment.

FIG. 6 is a block diagram showing one example of the internal composition of the game device 10. The game device 10 comprises, in addition to the constituent parts described above, electronic components, such as an information processing unit 31, a main memory 32, an external memory interface (external memory I/F) 33, an external data memory I/F 34, an internal data memory 35, a wireless communication module 36, a local communication module 37, a real-time clock (RTC) 38, an acceleration sensor 39, an angular rate sensor 40, a power supply circuit 41 and an interface circuit (I/F circuit) 42, and the like. These electronic components are mounted on an electronic circuit board and are accommodated inside the lower housing 11 (or inside the upper housing 21).

The information processing unit 31 is information processing means comprising a CPU (Central Processing Unit) 311 for executing a predetermined program and a GPU (Graphics Processing Unit) 312 for performing image processing, or the like. In the present embodiment, the predetermined program is stored in a memory inside the game device 10 (for example, an external memory 45 connected to the external memory I/F 33 or the internal data memory 35). The CPU 311 of the information processing unit 31 executes image processing and game processing as described below, by executing the predetermined program. The program executed by the CPU 311 of the information processing unit 31 may be acquired from another device by means of communication with the other device. Furthermore, the information processing unit 31 includes a VRAM (Video RAM) 313. The GPU 312 of the information processing unit 31 generates an image in accordance with a command from the CPU 311 of the information processing unit 31 and renders the image in the VRAM 313. The GPU 312 of the information processing unit 31 outputs the image rendered in the VRAM 313 to the upper LCD 22 and/or the lower LCD 12, and this image is displayed on the upper LCD 22 and/or the lower LCD 12.

The main memory 32, external memory I/F 33, external data memory I/F 34, and internal data memory 35 are connected to the information processing unit 31. The external memory I/F 33 is an interface for detachably connecting the external memory 45. Furthermore, the external data memory I/F 34 is an interface for detachably connecting the external data memory 46.

The main memory 32 is volatile storage means which is used as a work area or buffer area of the information processing unit 31 (CPU 311). In other words, the main memory 32 temporarily stores various data used in image processing and game processing, and temporarily stores a program acquired from an external source (the external memory 45, another device, or the like). In the present embodiment, a PSRAM (Pseudo-SRAM), for example, is used as the main memory 32.

The external memory 45 is non-volatile storage means for storing a program which is executed by the information processing unit 31. The external memory 45 is composed by a read-only semiconductor memory, for example. When the external memory 45 is connected to the external memory I/F 33, the information processing unit 31 is able to read a program stored in the external memory 45. Predetermined processing is carried out by executing the program read in by the information processing unit 31. The external data memory 46 is constituted by a non-volatile rewriteable memory (for example, a NAND type flash memory), and is used to store predetermined data. For example, images captured by the outside imaging unit 23 or images captured by another device are stored in the external data memory 46. When the external data memory 46 is connected to the external data memory I/F 34, the information processing unit 31 is able to read in images stored in the external data memory 46 and display the images on the upper LCD 22 and/or the lower LCD 12.

The internal data memory 35 is constituted by a non-volatile rewriteable memory (for example, a NAND type flash memory), and is used to store predetermined data. For example, data and programs downloaded by wireless communication via the wireless communication module 36 are stored in the internal data memory 35.

The wireless communication module 36 has a function of connecting to a wireless LAN by a method conforming to the IEEE 802.11 b/g standard, for example. Furthermore, the local communication module 37 has a function of performing wireless communication with a game device of the same type, by means of a predetermined communication method (for example, infrared communication). The wireless communication module 36 and the local communication module 37 are connected to the information processing unit 31. The information processing unit 31 can use the wireless communication module 36 to send and receive data to and from other devices via the Internet, and can use the local communication module 37 to send and receive data to and from other game devices of the same type.

The acceleration sensor 39 is connected to the information processing unit 31. The acceleration sensor 39 determines the magnitude of acceleration (linear acceleration) in linear directions following three axial directions (in the present embodiment, the xyz axes). The acceleration sensor 39 is provided inside the lower housing 11, for example. As shown in FIG. 1, the acceleration sensor 39 respectively determines the magnitude of the linear acceleration of the game device 10 produced in each axial direction, taking the x axis to be the long edge direction of the lower housing 11, taking the y axis to be the short edge direction of the lower housing 11, and taking the z axis to be direction perpendicular to the inner surface (main surface) of the lower housing 11. The acceleration sensor 39 is, for instance, an electrostatic capacitance type of acceleration sensor, but it is also possible to use an acceleration sensor based on another method. Furthermore, the acceleration sensor 39 may also be an acceleration sensor which determines acceleration in one axial direction or two axial directions. The information processing unit 31 receives data indicating the acceleration as determined by the acceleration sensor 39 (acceleration data), and calculates the attitude and movement of the game device 10.

The angular rate sensor 40 is connected to the information processing unit 31. The angular rate sensor 40 respectively determines the angular velocity produced about the three axes of the game device 10 (in the present embodiment, the xyz axes), and outputs data indicating the determined angular velocities (angular velocity data) to the information processing unit 31. The angular rate sensor 40 is provided inside the lower housing 11, for example. The information processing unit 31 receives angular velocity data output from the angular rate sensor 40 and calculates the attitude and movement of the game device 10.

The RTC 38 and power supply circuit 41 are connected to the information processing unit 31. The RTC 38 outputs a time count to the information processing unit 31. The information processing unit 31 calculates a current time (and date) on the basis of the time measured by the RTC 38. The power supply circuit 41 controls the power from the power source of the game device 10 (the rechargeable battery accommodated in the lower housing 11) and supplies power to the respective components of the game device 10.

The I/F circuit 42 is connected to the information processing unit 31. The microphone 43, speakers 44 and touch panel 13 are connected to the I/F circuit 42. More specifically, the speakers 44 are connected to the I/F circuit 42 via an amplifier which is not illustrated. The microphone 43 detects the user's voice and outputs an audio signal to the I/F circuit 42. The amplifier amplifies the audio signal from the I/F circuit 42, and outputs sound to the speakers 44. The I/F circuit 42 includes an audio control circuit which controls the microphone 43 and the speakers 44 (amplifier), and a touch panel control circuit which controls the touch panel 13. The audio control circuit performs A/D conversion and D/A conversion of the audio signal, or converts the audio signal to audio data of a predetermined format. The touch panel control circuit generates touch position data of a predetermined format on the basis of a signal from the touch panel 13 and outputs the touch position data to the information processing unit 31. The touch position data indicates the coordinates of a position where an input has been made (touch position) on the input surface of the touch panel 13. The touch panel control circuit reads in a signal from the touch panel 13 and generates touch position data at a rate of once every predetermined time period. The information processing unit 31 can identify the touch position where input has been made on the touch panel 13, by acquiring the touch position data.

The operating buttons 14 include the operating buttons 14A to 14L mentioned above, and are connected to the information processing unit 31. Operating data indicating the input status of the respective operating buttons 14A to 14I (whether or not the button is pressed) is output to the information processing unit 31 from the operating buttons 14. The information processing unit 31 executes processing in accordance with the inputs to the operating buttons 14, by acquiring operating data from the operating buttons 14.

The lower LCD 12 and the upper LCD 22 are connected to the information processing unit 31. The lower LCD 12 and the upper LCD 22 display images in accordance with instructions from the information processing unit 31 (GPU 312). In the present embodiment, the information processing unit 31 causes an image for a handwritten image input operation to be displayed on the lower LCD 12, and causes an image acquired by either the outside imaging unit 23 or the inside imaging unit 24 to be displayed on the upper LCD 22. In other words, the information processing unit 31 causes a stereo image (a stereoscopically viewable image) using a right-eye image and a left-eye image captured by the outside imaging unit 23 to be displayed on the upper LCD 22, or causes a planar image captured by the inside imaging unit 24 to be displayed on the upper LCD 22, or causes a planar image using one of the right-eye image and the left-eye image captured by the outside imaging unit 23 to be displayed on the upper LCD 22.

More specifically, the information processing unit 31 is connected to an LCD controller (not illustrated) of the upper LCD 22, and controls the on/off switching of the parallax barrier in the LCD controller. If the parallax barrier of the upper LCD 22 is switched on, then the right-eye image and the left-eye image stored in the VRAM 313 of the information processing unit 31 (images captured by the outside imaging unit 23) are output to the upper LCD 22. More specifically, the LCD controller reads out a right-eye image and a left-eye image from the VRAM 313 by alternately repeating a process of reading out pixel data for one line in the vertical direction in respect of the right-eye image and a process of reading out pixel data for one line in the vertical direction in respect of the left-eye image. By this means, the right-eye image and the left-eye image are divided into strip-shaped images in which pixels are aligned vertically for each line, and an image formed by alternately arranging the divided strip-shaped images of the right-eye image and strip-shaped images of the left-eye image is displayed on the screen of the upper LCD 22. When this image is viewed by the user via the parallax barrier of the upper LCD 22, the right-eye image is viewed by the user's right eye and the left-eye image is viewed by the user's left eye. By this means, a stereoscopically viewable image is displayed on the screen of the upper LCD 22.

The outside imaging unit 23 and the inside imaging unit 24 are connected to the information processing unit 31. The outside imaging unit 23 and the inside imaging unit 24 capture images in accordance with an instruction from the information processing unit 31, and output captured image data to the information processing unit 31. In the present embodiment, an imaging instruction is issued to either one of the outside imaging unit 23 and the inside imaging unit 24, and the imaging unit receiving the imaging instruction captures an image and sends image data to the information processing unit 31. More specifically, an imaging unit to be used is selected by an operation performed by the user via the touch panel 13 or the operating buttons 14. The information processing unit 31 (CPU 311) detects that an imaging unit has been selected and duly issues an imaging instruction to the outside imaging unit 23 or the inside imaging unit 24.

When the outside imaging unit 23 or the inside imaging unit 24 is started up by an instruction from the information processing unit 31 (CPU 311), imaging is performed at a rate of 60 frames per second, for example. The images captured by the outside imaging unit 23 or the inside imaging unit 24 are successively supplied to the information processing unit 31, and displayed on the upper LCD 22 or the lower LCD 12 by the information processing unit 31 (GPU 312). When the captured images are output to the information processing unit 31, the images are stored in the VRAM 313 and output to the upper LCD 22 or the lower LCD 12, and then deleted at a predetermined timing. By capturing images at a rate of 60 frames per second, for example, and displaying the captured images, the game device 10 can display the scene in the imaging range of the outside imaging unit 23 and the inside imaging unit 24, in real time, on the upper LCD 22 or the lower LCD 12.

The 3D adjustment switch 25 is connected to the information processing unit 31. The 3D adjustment switch 25 sends an electric signal corresponding to the position of the slider to the information processing unit 31.

The 3D indicator 26 is connected to the information processing unit 31. The information processing unit 31 controls the lighting up of the 3D indicator 26. For example, if the upper LCD 22 is in stereoscopic display mode, then the information processing unit 31 causes the 3D indicator 26 to light up.

<Configuration of Functions>

Figure 7:
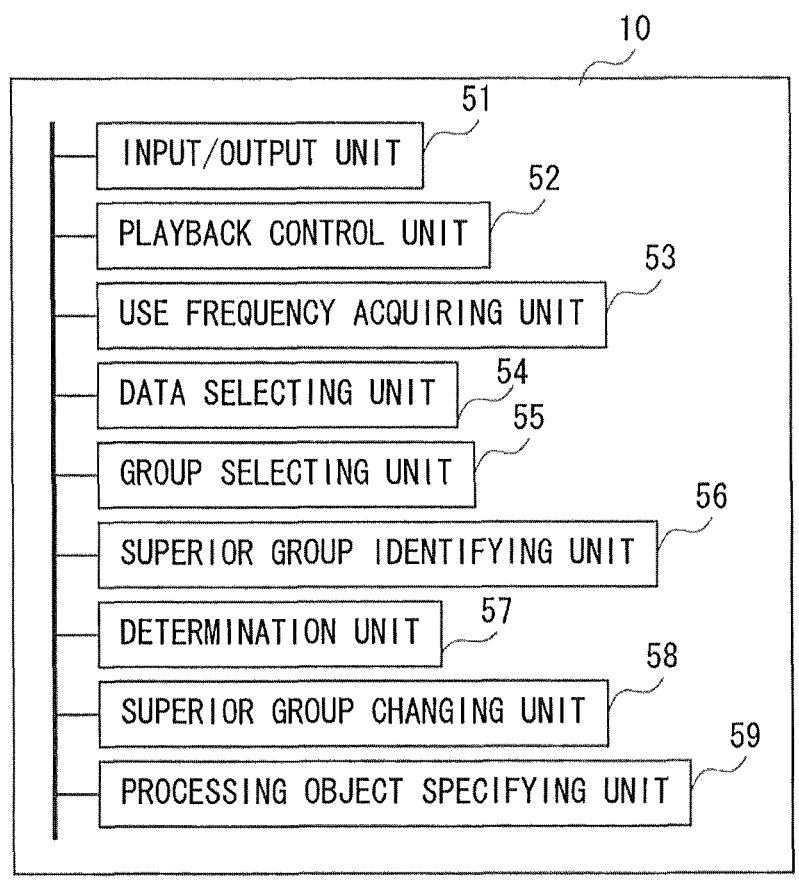
FIG. 7 is a diagram schematically showing an example non-limiting functional composition of a game device according to an embodiment.

FIG. 7 is a diagram schematically showing one example of a functional composition of the game device 10 according to the present embodiment. As a result of the information processing unit 31 executing a program extracted on the main memory 32 and controlling the respective constituent parts described with reference to FIG. 6, the game device 10 according to the present embodiment functions as a game device comprising an input/output unit 51, a playback control unit 52, a use frequency acquiring unit 53, a data selecting unit 54, a group selecting unit 55, a superior group identifying unit 56, a determination unit 57, a superior group changing unit 58, and a processing object specifying unit 59. Moreover, while the respective functional units described above are realized in the present embodiment by the information processing unit 31 comprising the CPU 311, a part of or all of the respective functional units described above may be realized by dedicated processors instead of the CPU 311.

In addition, in the present embodiment, files in the external data memory 46 are music files and correspond to data according to the present disclosure. Furthermore, a folder containing the respective files corresponds to a group according to the present disclosure. However, while music files are set as the type of data to become processing objects in the present embodiment, the present disclosure may be applied to an information processing device that sets other types of data as processing objects. For example, processing object data may alternatively be image files, video files, document files, and the like.

The playback control unit 52 provides a user with a music file management/playback function by managing and playing back music files recorded on the external data memory 46 (in the example shown in the present embodiment, an SD (registered trademark) card) connected to a connector provided inside the cover section 11C. In addition, the playback control unit 52 records a history of a music file that has been played back (hereinafter, referred to as a "playback history") regardless of whether the playback is a normal playback process or a shuffle playback process, which will be described later. Playback history is information corresponding to usage history according to the present disclosure, and may be recorded per file based on a playback count associated with identification information of the file (for example, a file path) or may be recorded per playback of a file according to sequential accumulation of file identification information (for example, a file path) regarding playback.

Moreover, the game device 10 according to the present embodiment accommodates data compression formats such as MP3 (MPEG Audio Layer-3) and AAC (Advanced Audio Coding), and is capable of playing back music files compressed in these data compression formats in both a normal playback process in which the user selects and plays back a desired music file and a shuffle playback process to be described later. However, a detailed description of a normal playback process will be omitted in the description of the present embodiment.

The use frequency acquiring unit 53 acquires a playback frequency of a file or a folder. In the present embodiment, objects of acquisition of playback frequency are music files. The use frequency acquiring unit 53 acquires a playback frequency of a file by referencing a playback history recorded by the playback control unit 52. When the playback history is recorded based on a playback count, the use frequency acquiring unit 53 acquires the playback frequency of the file by acquiring the playback count, and when the playback history is recorded based on an accumulation of identification information, the use frequency acquiring unit 53 acquires the playback frequency of the file by compiling the accumulated identification information (by integrating the number of pieces of identification information). In addition, the use frequency acquiring unit 53 is capable of identifying, from a playback history of a file, a folder containing each file included in the playback history and requesting a playback history of the folder. A playback frequency of a folder can be acquired from a playback history of the folder obtained in this manner. Moreover, instead of obtaining a playback history of a folder from a playback history of a file, a playback history of a folder may be arranged to be separately recorded in addition to a playback history of a file every time a file is played back.

The data selecting unit 54 selects a file through a predetermined process. As the predetermined process, a process of selecting data from data satisfying a predetermined condition or a process of selecting data from all pieces of data is adopted. More specifically, in the present embodiment, as a process of selecting data from data satisfying a predetermined condition, a process is adopted in which one file is randomly selected from files having a playback frequency, acquired by the use frequency acquiring unit 53, which ranks within the top ten (this value may be appropriately set according to the embodiment) in playback frequencies. In addition, as a process of selecting data from all pieces of data, a process is adopted in which one file is randomly selected from all music files recorded on the external data memory 46. In the present embodiment, while such processes are set as the predetermined process and one file is selected by the execution of the set predetermined process, other processes may be set as the predetermined process. For example, a process in which one file is randomly selected from files having a playback frequency which ranks within the bottom ten (this value may be appropriately set according to the embodiment) in playback frequencies may be adopted as the predetermined process.

Furthermore, the predetermined condition may be set to conditions such as a name of a file or a title of a song related to the file including a certain word, a song included in the file having a certain melody or tempo, or playback time being within a certain period of time. Moreover, a plurality of conditions may be set as the predetermined condition such as a file having a playback frequency that ranks within the top ten playback frequencies and the file including a song with a certain melody. In this case, when information such as melody and playback time cannot be acquired from the management information of a file (for example, a file management table), the information can be acquired by opening the file and referencing meta-information (a tag or the like) in the file or analyzing contents of actual data included in the file.

The group selecting unit 55 selects a folder through a predetermined process. As the predetermined process, a process of selecting a folder from folders satisfying a predetermined condition or a process of selecting a folder from all folders is adopted. More specifically, in the present embodiment, as a process of selecting a folder from folders satisfying a predetermined condition, a process is adopted in which one folder is randomly selected from folders having a playback frequency, acquired by the use frequency acquiring unit 53, which ranks within the top ten (this value may be appropriately set according to the embodiment) in playback frequencies. In addition, as a process of selecting a folder from all folders, a process is adopted in which one folder is randomly selected from all folders recorded on the external data memory 46. In the present embodiment, while such processes are set as the predetermined process and one folder is selected by the execution of the set predetermined process, other processes may be set as the predetermined process. For example, a process in which one folder is randomly selected from folders having a playback frequency which ranks within the bottom ten (this value may be appropriately set according to the embodiment) in playback frequencies may be adopted as the predetermined process.

Furthermore, the predetermined condition may be set to conditions such as the number of files contained in a folder being within a certain number range or a name of a folder or a name of an artist related to the folder including a certain word. When such information cannot be acquired from the management information of a file, the information can be acquired by opening the file included in the folder and referencing meta-information (a tag or the like) in the file or analyzing contents of actual data included in the file.

The superior group identifying unit 56 identifies a superior folder that is at least one level higher than a predetermined folder. Folders of the respective files in the external data memory 46 connected to the game device 10 according to the present embodiment are managed by means of a tree structure. Specifically, files in the external data memory 46 are managed using a hierarchically-structured file system and a directory structure. Therefore, the superior group identifying unit 56 identifies a superior group by identifying a superior folder that is at least one level higher than a folder containing the file selected by the data selecting unit 54 (at least two levels higher when the selected file is set as a starting point) or by identifying a superior folder that is at least one level higher than a folder selected by the group selecting unit 55.

The determination unit 57 makes determinations on whether or not an appropriate superior folder has been identified such as a determination on whether or not a superior folder has been identified and a determination on whether or not a plurality of subordinate folders containing a predetermined type of files (in the present embodiment, music files) is subordinate to a superior folder.

When it is determined by the determination unit 57 that an appropriate superior group has not been identified, the superior group changing unit 58 changes a superior group by retracing at least one level higher than the superior group identified by the superior group identifying unit 56.

The processing object specifying unit 59 specifies a file contained in a subordinate folder that is subordinate to a superior folder as a processing object (in the present embodiment, a processing object of a shuffle playback process).

The input/output unit 51 accepts input based on a user operation via various input devices provided in the game device 10 such as the touch panel 13, the operating buttons 14A to 14L, and the built-in microphone 43, and performs output to the user via various output devices provided in the game device 10 such as the upper LCD 22, the lower LCD 12, and the speaker 44.

<User Interface>

Next, a user interface when using a music file management/playback function according to the present embodiment will be described.

Figure 8:
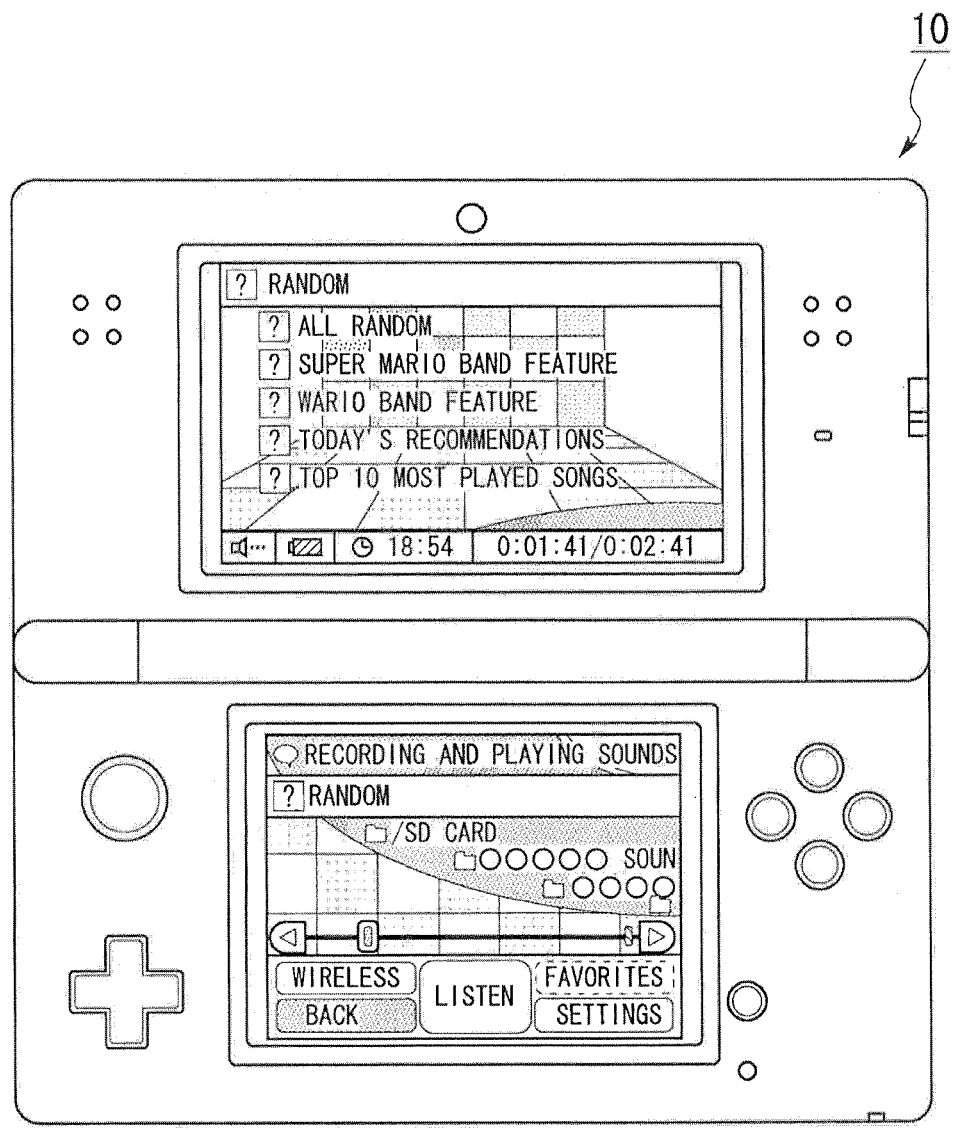
FIG. 8 is a diagram showing an example non-limiting game device in a state where a top screen of a music file management/playback function interface is displayed according to an embodiment.

FIG. 8 is a diagram showing one example of the game device 10 in a state where a top screen of a music file management/playback function interface according to the present embodiment is displayed. When the music file management/playback function is executed by a user from an initial screen (not shown) displayed after activation of the game device 10 by, for example, selecting a button image displayed on the initial screen using the touch panel 13 or the operating buttons 14A to 14L, the input/output unit 51 causes the top screen shown in FIG. 8 to be displayed on the upper LCD 22 and the lower LCD 12 to provide the user with the music file management/playback function. On the top screen, menu items selectable by the user (in the example shown in FIG. 8, "Recording and Playing with Sounds", "Random", "SD (registered trademark) card", and the like) is displayed on the lower LCD 12, whereby the user can change a desired menu item to a selected state by using the touch panel 13 or the operating buttons 14A to 14L. In addition, the upper LCD 22 displays a submenu included in the menu item that is in a selected state on the lower LCD 12.

In the game device 10 according to the present embodiment, by changing the menu item "Recording and Playing with Sounds" to a selected state and then finalizing the selection, sound acquired via the built-in microphone 43 can be recorded. However, a detailed description of a recording function will be omitted in the description of the present embodiment. Furthermore, in the game device 10 according to the present embodiment, by changing the menu item "SD (registered trademark) card" to a selected state and then finalizing the selection, a list of music files recorded on the external data memory 46 can be referenced and a desired music file can be selected and played back from the list.

Moreover, in the game device 10 according to the present embodiment, operations for changing a menu item to a selected state includes an operation involving holding the lower LCD 12 and tapping an area of the touch panel 13 which displays a character string of the menu item with the touch pen 28 or a finger, and an operation involving switching the menu item in a selected state to another menu item using the four-way button 14A (direction input button 14A) or the analog stick 15.

In addition, in the game device 10 according to the present embodiment, operations for finalizing a selection of a menu item includes an operation performed when any of the menu items is in a selected state involving, for example, tapping an image of the "Open" button of the lower LCD 12 with the touch pen 28 or a finger or pressing the operating button 14B (A button).

For example, when the menu item "Random" is in a selected state on the lower LCD 12, a submenu including "All Random", two "Features" (in the example shown in FIG. 8, a "SUPER MARIO BAND Feature" and a "WARIO BAND Feature"), "Today's Recommendations", and "Top 10 Most Played Songs" is displayed on the upper LCD 22. The submenu is displayed in accordance with the music file that is the playback object. When an operation for finalizing the menu item that is in a selected state on the lower LCD 12 is performed by the user using the touch panel 13 or the operating buttons 14A to 14L, the screen changes to a screen after selection of a menu item.

Figure 9:
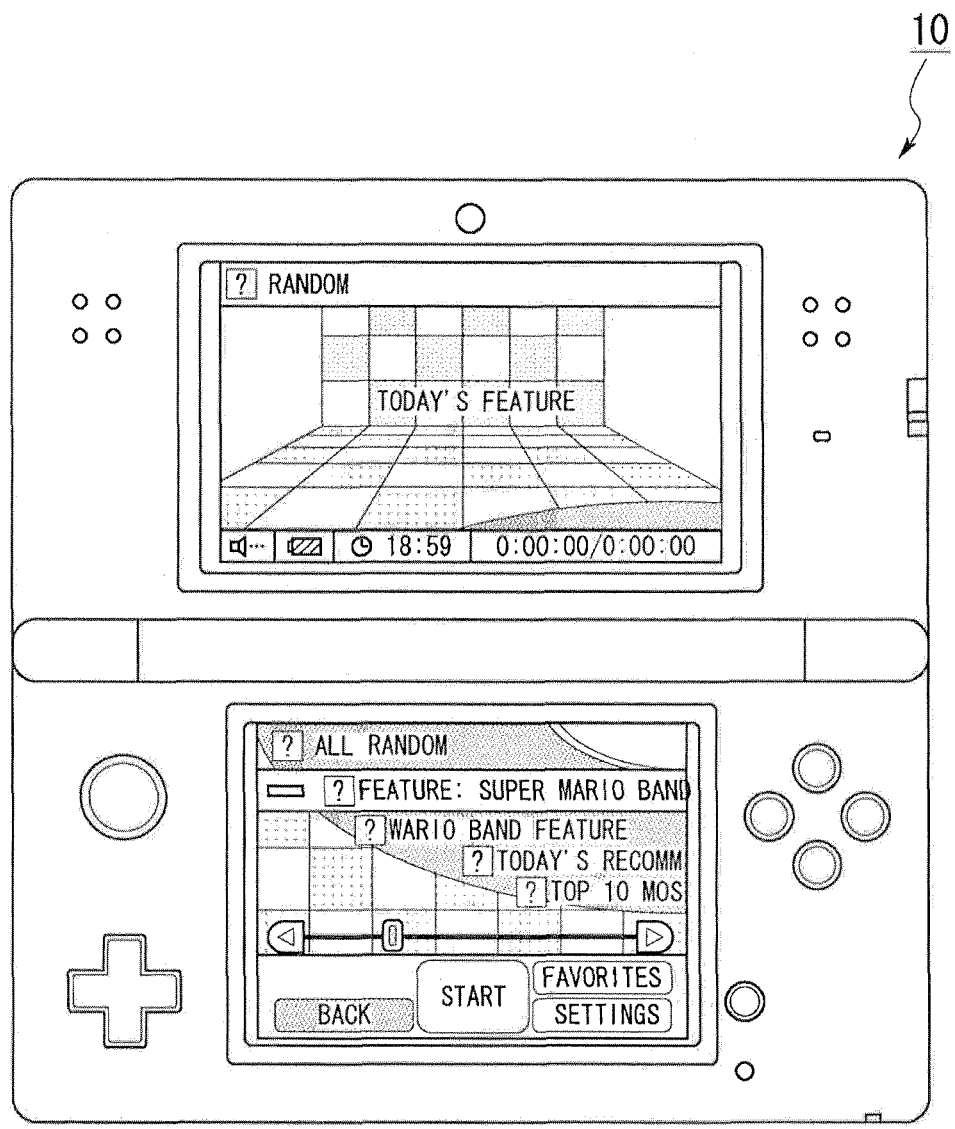
FIG. 9 is a diagram showing an example non-limiting game device in a state where a "Random" menu screen of a music file management/playback function interface is displayed according to an embodiment.

FIG. 9 is a diagram showing one example of the game device 10 in a state where a "Random" menu screen of the music file management/playback function interface according to the present embodiment is displayed. The menu screen shown in FIG. 9 is a screen to which the top screen shown in FIG. 8 changes when an operation for finalizing a menu item is performed by the user. On the menu screen, the submenu displayed on the upper LCD 22 on the top screen (refer to FIG. 8) is displayed on the lower LCD 12 and becomes selectable by a user operation. Since the "Random" menu item is opened in the example shown in FIG. 9, a submenu including "All Random", two "Features", "Today's Recommendations", and "Top 10 Most Played Songs" is displayed on the lower LCD 12.

Moreover, the "Random" menu item is a menu item including a submenu for performing shuffle playback of music files that are processing objects. In this case, shuffle playback refers to playing back a plurality of processing object (playback object) music files in a random order by rearranging a sorted order or a managed original order. However, the present disclosure may be applied to random playback in which, instead of rearranging a plurality of processing object music files prior to playback, music files are played back by randomly extracting a next song every time a song is played back.

The "All Random" submenu item is a submenu item for performing shuffle playback by setting all music files recorded on the external data memory 46 as processing objects. In addition, the "Today's Recommendations" submenu item is a submenu item for performing shuffle playback by setting music files stored in a randomly selected folder among the music files recorded on the external data memory 46 as processing objects, and the "Top 10 Most Played Songs" submenu item is a submenu item for performing shuffle playback by setting a maximum of ten music files selected by the user in advance as processing objects.

Furthermore, the two "Feature" submenu items are submenu items for performing shuffle playback by setting music files specified in an automatically generated playback object list among the music files recorded on the external data memory 46 as processing objects. In other words, in the present embodiment, music files specified in a playback object list corresponds to processing objects according to the present disclosure. Hereinafter, generation of a playback object list for a "Feature" submenu item and playback of music files based on the generated playback object list according to the present embodiment will be described.

<Flow of Processing>

Next, flows of a superior group identification process, a processing object specification process, and a shuffle playback process according to the present embodiment will be described.

Figure 10:
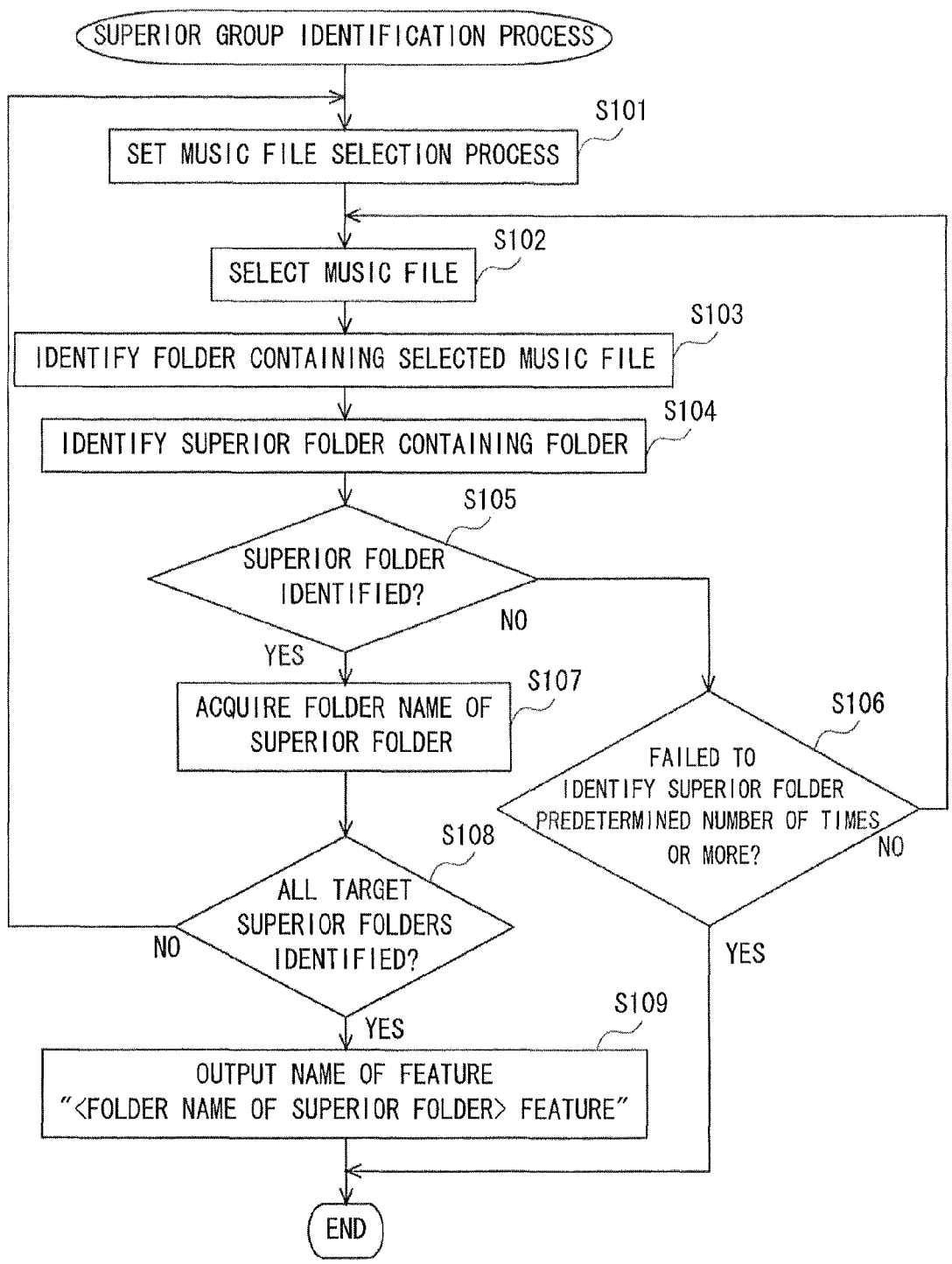
FIG. 10 is a flow chart showing an example non-limiting flow of a superior group identification process according to an embodiment.

FIG. 10 is a flow chart showing one example of a flow of a superior group identification process according to the present embodiment. The process shown in the present flow chart is executed when the "Random" menu item is changed to a selected state on the screen shown in FIG. 8. However, execution of the superior group identification process may be completed before the "Feature" submenu is displayed, and a trigger for starting the superior group identification process is not limited to the "Random" menu item being changed to a selected state. For example, the superior group identification process may be executed when the music file playback/management function is activated or when activation of the game device 10 is completed. Moreover, specific contents, order, and the like of the process shown in the present flow chart represent an example of implementing the present disclosure. Specific contents, order, and the like may be appropriately selected according to the embodiment.

In step S101, a process is set for selecting a music file to become a key. The data selecting unit 54 sets, in accordance with a feature to be generated, a predetermined process that is applied when a music file to become a key is selected in step S102. In the present embodiment, the "Feature" submenu item presents the user with a feature that is automatically generated based on music files with a high playback frequency (corresponds to a frequency of use according to the present disclosure; in the present embodiment, a playback count is used as the playback frequency) (hereinafter, referred to as "Feature 1") and a feature that is automatically generated based on music files randomly selected from all music files recorded on the external data memory 46 (hereinafter, referred to as "Feature 2").

In the present embodiment, when generating the Feature 1, the data selecting unit 54 sets a playback frequency of a music file which ranks in the top ten (this value may be appropriately set according to the embodiment) in playback frequencies as the predetermined condition and sets randomly selecting a file from files satisfying this condition as the predetermined process. In addition, when generating the Feature 2, the data selecting unit 54 sets selecting a music file from music files recorded on the external data memory 46 (in other words, all music files are objects) as the predetermined process. Subsequently, the process proceeds to step S102.

In step S102, a music file to become a key is selected. By executing the predetermined process, the data selecting unit 54 selects one music file to become a key of the superior group identification process from music files recorded on the external data memory 46.

In the present embodiment, when generating the Feature 1, the data selecting unit 54 selects a music file to become a key by executing a process for randomly selecting one music file from music files with playback frequencies ranking in the top ten as the predetermined process. In this case, a playback frequency is acquired by the use frequency acquiring unit 53. Furthermore, when generating the Feature 2, a music file to become a key is selected by executing a process for randomly selecting one music file from all music files recorded on the external data memory 46 as the predetermined process. In doing so, the data selecting unit 54 identifies all music files that are selection candidates by extracting only music files from all files recorded on the external data memory 46. As a method of extracting only music files from all files, a method of extracting all files having a predetermined extension or a method of referencing management information of files may be adopted. In addition, while a greater amount of resources is generally required, a method may be adopted in which a data type is identified by opening a file and referencing meta-information or content data. Once a music file to become a key is selected, the process proceeds to step S103.

Moreover, in the present embodiment, while a process for randomly selecting one music file from music files with high playback frequencies and a process for randomly selecting one music file from all music files are adopted as the predetermined process for selecting a music file to become a key, the music file to become a key may be selected by other processes. For example, a music file to become a key may be selected from a population made up of music files in which a predetermined word is included in a file name or a song title, a population made up of music files having a predetermined melody or tempo, or a population made up of music files whose playback time is within a predetermined period of time. When such information cannot be acquired from the management information of a file, the information can be acquired by opening the file and referencing meta-information (a tag or the like) in the file or analyzing contents of actual data included in the file. However, a process of opening a file to acquire meta-information or a process of analyzing contents of actual data causes a high load and may slow down the device. On the other hand, using playback history or using file management information, file names, and the like as is the case of the present embodiment eliminates the need for such processes and can reduce processing load.

In step S103, a folder that includes the music file to become a key is identified. Based on the music file to become a key identified in step S102, the superior group identifying unit 56 identifies a folder containing the music file. Specifically, methods that can be used include a method of identifying a folder by referencing file management information of a folder (directory) in which the selected music file exists (for example, when a file is managed by a so-called file management table such as an FAT (File Allocation Table), the file management table is referenced) and a method of extracting a path of a folder containing the selected music file by acquiring a path of the selected music file and deleting the file name from the acquired path. However, specific methods of identifying a folder are not limited to those exemplified above. Subsequently, the process proceeds to step S104.

In step S104, a superior folder containing a subordinate folder is identified. The superior group identifying unit 56 identifies a folder that is higher than the folder identified in step S103 by an arbitrary number of levels. In the present embodiment, the superior group identifying unit 56 identifies a folder that is one level higher than the folder identified in step S103. Specifically, the superior group identifying unit 56 may identify a superior folder by referencing file management information of a folder (directory) in which the folder identified in step S103 exists, by performing a process such as moving a current directory from the folder identified in step S103, or by acquiring a path of the folder identified in step S103 and deleting file names corresponding to a desired number of lower levels from the acquired path to extract a path to a superior folder. By identifying such a superior folder, music files managed using folders per a given unit (for example, per album or per playlist) can be extracted across a plurality of folders.

Figure 11:
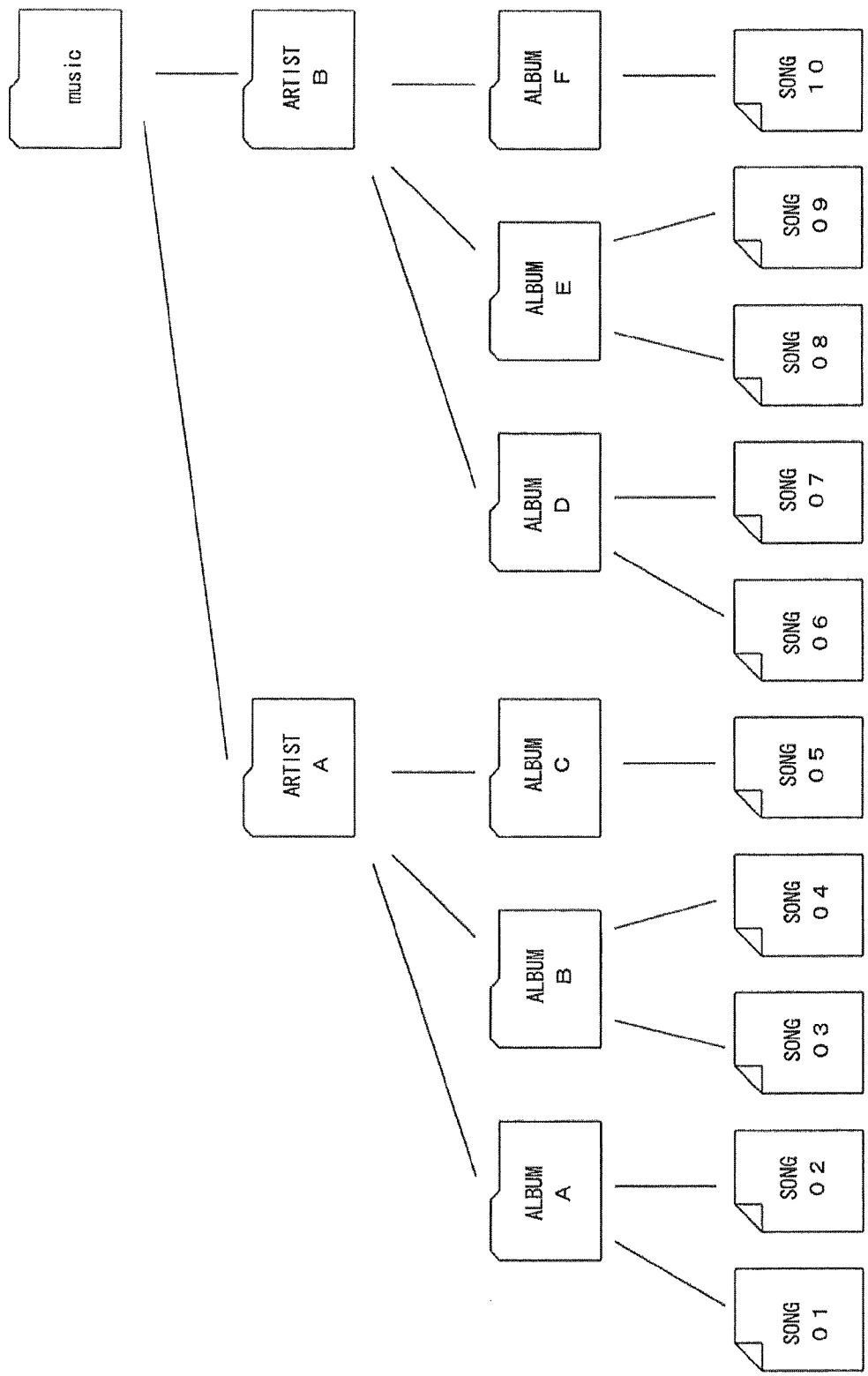
FIG. 11 is a diagram showing an example non-limiting folder structure in an external data memory according to an embodiment.

FIG. 11 is a diagram showing one example of a folder structure in the external data memory 46 according to the present embodiment. The example shown in FIG. 11 has a folder structure in which folders provided for respective artists (artists A and B in FIG. 11; hereinafter referred to as "artist folders") contain folders provided for respective albums of the artists (albums A to F in FIG. 11; hereinafter referred to as "album folders") and, in turn, the album folders contain music files of songs included in the albums (songs 01 to 10 in FIG. 11). In this case, according to the process shown in the present flow chart, after the music file to become a key is selected (step S102), an album folder containing the music file is identified (step S103), and an artist folder that is one level higher than the album folder is identified (step S104).

Moreover, in a case where a database that manages files (such as a database of music file management software) is provided separately from the hierarchical folder structure, a superior group in the database may be identified. In other words, a hierarchical relationship in which respective music files are divided into groups per a given unit and the groups are further divided into superior groups is specified separately from the hierarchical structure in the file system as a hierarchical structure in the database by a method such as using management information of the database, whereby the superior group may be identified based on the hierarchical structure in the database. In this case, the superior group identifying unit 56 identifies a group such as a playlist that contains the file by referencing the management information of the database (step S103), and identifies a group that is one level higher than the identified group (step S104).

In steps S105 and S106, a determination is made on whether or not a superior folder has been identified, and when a failure to identify a superior folder occurs a predetermined number of times or more, the process shown in the present flow chart is terminated. The determination unit 57 determines whether or not a superior folder has been identified in step S104 (step S105). The determination unit 57 determines that a superior folder has not been identified when an attempt is made in step S104 to identify a superior folder that is higher by a desired number of levels but such a folder did not exist (in other words, a most superior folder had been reached before reaching a superior folder that is higher by the desired number of levels). In addition, the determination unit 57 also determines that a superior folder has not been identified when the folder that is higher by a desired number of levels is a duplication of a superior folder for the "Feature" submenu item which has already been identified (in the example shown in the present embodiment, when a superior folder intended to be identified for the Feature 2 is a duplication of the superior folder identified for the Feature 1). At this point, when it is determined that a superior folder has not been identified (when an identification of a superior folder has failed), the determination unit 57 counts the number of failures to identify a superior folder. Subsequently, when a failure to identify a superior folder occurs a predetermined number of times or more, the input/output unit 51 outputs a top screen or a menu screen that does not include a feature display via the upper LCD 22 or the lower LCD 12 (in other words, does not output a feature) and the process shown in the present flow chart is terminated (step S106). On the other hand, when it is determined that a superior folder has not been identified (step S105) but the number of failures has not reached the predetermined number of times (step S106), the process proceeds to step S102.

Conversely, when it is determined that a superior folder has been identified, the process proceeds to step S107. In step S107, a folder name of the superior folder is acquired. The processing object specifying unit 59 acquires the folder name of the superior folder identified in step S104 by reading the folder name from an area of the storage device in which folder names are retained such as file management information. Subsequently, the process proceeds to step S108.

In step S108, a determination is made on whether or not all target superior folders have been identified. In the present embodiment, the user is presented with the Feature 1 for which superior folders are identified based on a music file to become a key which is selected from music files included in songs ranking within the top ten (this value may be appropriately set according to embodiment) in playback frequency, and the Feature 2 for which superior folders are identified based on a music file to become a key which is selected from all music files. Therefore, in step S108, a determination that all target superior folders have been identified is made when both the superior folder for the Feature 1 and the superior folder for the Feature 2 are identified. When it is determined that all target superior folders have not been identified, the process proceeds to step S101 and a key music file for a different "Feature" submenu item is selected. In other words, in the process according to the present flow chart, processes from step S101 to step S107 are repetitively executed until all target superior folders have been identified. Moreover, in the present embodiment, predetermined processes for selecting a key music file differ among different "Features" (refer to step S101). Therefore, in step S101, every time a process is executed, a predetermined process for selecting a key music file is set to a different process. In other words, when a superior folder related to the "Feature 1" is identified and step S101 is once again executed, a predetermined process for the "Feature 2" is set in step S101. When it is determined that all target superior folders have been identified, the process proceeds to step S109.

In step S109, a name of a feature is outputted. The processing object specifying unit 59 generates a name of a feature based on the folder name of the superior folder acquired in step S107, and the input/output unit 51 outputs the generated feature name via the upper LCD 22 or the lower LCD 12 (refer to FIGS. 8 and 9). In the present embodiment, a feature name obtained by adding a character string "Feature" after a character string that is the folder name of the acquired superior folder is used. In the present embodiment, since two features, namely, the Feature 1 and the Feature 2 are generated, a character string of "<folder name of the superior folder extracted for Feature 1> feature" and a character string of "<folder name of the superior folder extracted for Feature 2> feature" are outputted to the upper LCD 22 or the lower LCD 12. However, feature names that are outputted are not limited to the examples described with respect to the present flow chart. For example, a character string may be adopted which is generated by adding another character string to the folder name of a superior folder such as "Random <folder name of superior folder>".

For example, in the example shown in FIG. 11, an artist folder is identified as the superior folder and a name of an artist is set as the folder name of this folder. In this case, a character string of "<artist name> feature" is displayed as the name of the feature on the upper LCD 22 or the lower LCD 12.

In addition, in the examples of the top screen shown in FIG. 8 and the "Random" menu screen shown in FIG. 9, a "SUPER MARIO BAND feature" and a "WARIO BAND feature" are displayed. This means that the folder name of the superior folder extracted for the Feature 1 is "SUPER MARIO BAND" and that the folder name of the superior folder extracted for the Feature 2 is "WARIO BAND". In other words, with the game device 10 according to the present embodiment, a feature can be generated and presented to a user in accordance with a file management method adopted by the user. In the examples of the top screen shown in FIG. 8 and the "Random" menu screen shown in FIG. 9, since the user manages music files by means of a hierarchical structure of "/artist/album/music file", a "Feature" having an artist name as a title is presented. Alternatively, when the management method adopted by the user has a hierarchical structure of "/genre/artist/music file", a "Feature" having a genre name as a title is presented, and when the management method adopted by the user has a hierarchical structure of "/game series/game title/music file", a "Feature" having a name of the game series as a title is presented. When the name of the feature is outputted in step S109, the process shown in the present flow chart is finished.

As described above, with the game device 10 according to the present embodiment, processing objects (in this case, music files for shuffle playback) can be specified across a plurality of folders without having to reference meta-information of music files such as tag information.

However, when there is only one subordinate folder containing data (in this case, a music file) that may potentially be a processing object with respect to the superior folder identified in step S104, music files cannot be extracted across a plurality of folders. In this case, while a playback object list that lists playback object music files extracted as-is from only one subordinate folder may be created (creation of a playback object list will be described later), a superior folder containing a plurality of subordinate folders may be re-identified by another method. Hereinafter, with reference to FIGS. 12 and 13, a description will be given on a method of re-identifying a superior folder by re-executing the superior group identification process from the beginning (refer to FIG. 12) and on a method of re-identifying a superior folder by identifying a folder of a level higher than the identified superior folder that only has one subordinate folder (refer to FIG. 13).

Figure 12:
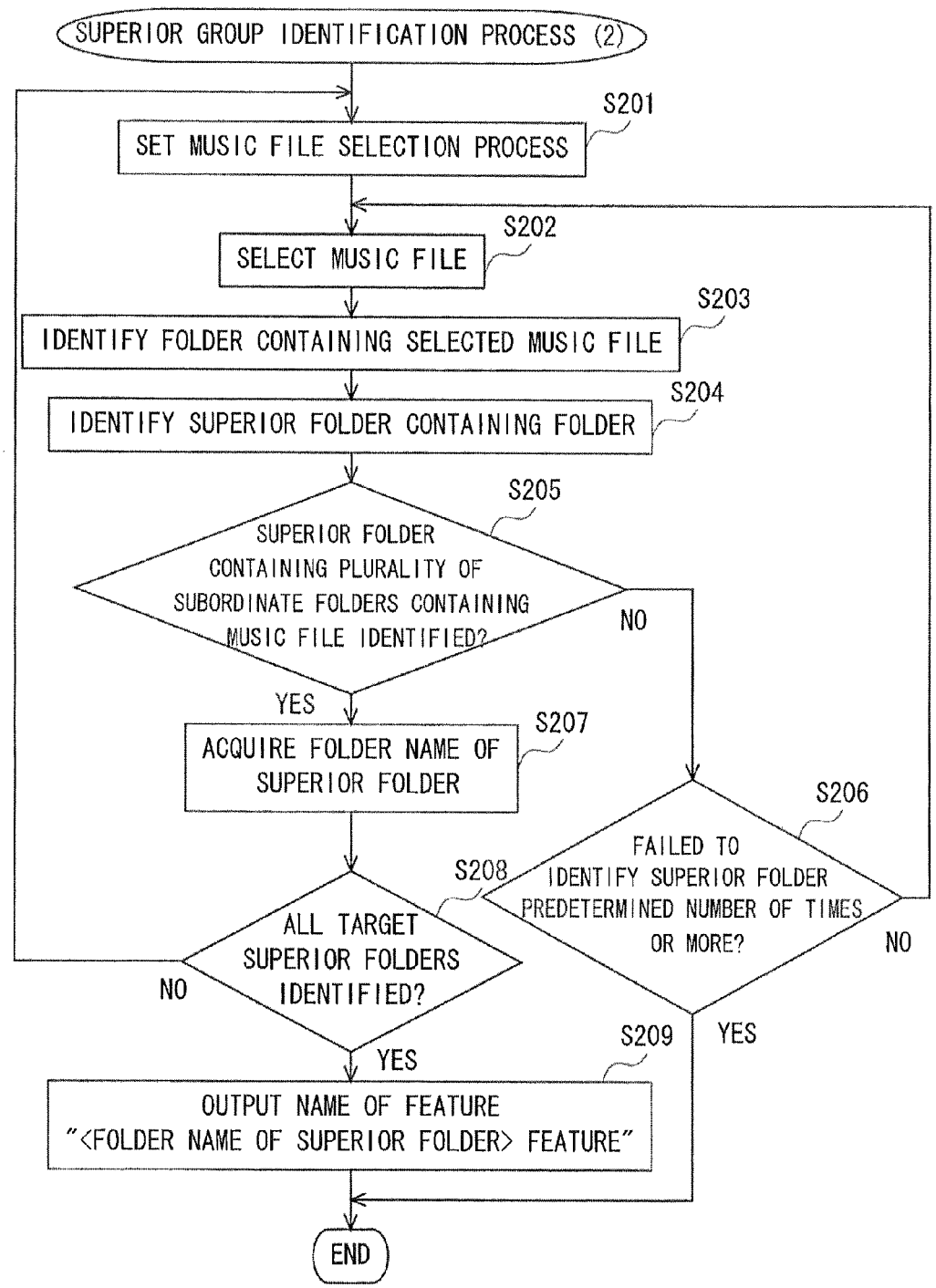
FIG. 12 is a flow chart showing an example non-limiting first variation of a superior group identification process.

FIG. 12 is a flow chart showing one example of a first variation of the superior group identification process. The process shown in the present flow chart is executed when the "Random" menu item is changed to a selected state on the screen shown in FIG. 8. However, execution of the superior group identification process may be completed before the "Feature" submenu is displayed, and a trigger for starting the superior group identification process is not limited to the "Random" menu item being changed to a selected state. For example, the superior group identification process may be executed when the music file playback/management function is activated or when activation of the game device 10 is completed. Moreover, specific contents, order, and the like of the process shown in the present flow chart represent an example of implementing the present disclosure. Specific contents, order, and the like may be appropriately selected according to the embodiment.

Since processes shown in steps S201 to S204 are approximately the same as the processes of steps S101 to S104 already described with reference to FIG. 10, a description thereof will be omitted. Subsequently, the process proceeds to step S205.

In steps S205 and S206, a determination is made on whether or not a superior folder having a plurality of subordinate folders containing music files (hereinafter, also referred to as an "appropriate superior folder") has been identified, and when a failure to identify an appropriate superior folder occurs a predetermined number of times or more, the process shown in the present flow chart is terminated. The determination unit 57 determines whether or not a superior folder has been identified in step S204 and, further, determines whether or not a superior folder having a plurality of subordinate folders has been identified by referencing contents of the subordinate folders that are subordinate to the identified superior folder (step S205). At this point, when it is determined that an appropriate superior folder has not been identified, the determination unit 57 counts the number of failures to identify a superior folder. Subsequently, when a failure to identify an appropriate superior folder occurs a predetermined number of times or more, the determination unit 57 terminates the process shown in the present flow chart (step S206). On the other hand, when it is determined that an appropriate superior folder has not been identified (step S205) but the number of failures has not reached the predetermined number of times (step S206), the process proceeds to step S202.

Conversely, when it is determined that an appropriate superior folder has been identified, the process proceeds to step S207. Since processes shown in steps S207 to S209 are approximately the same as the processes of steps S107 to S109 already described with reference to FIG. 10, a description thereof will be omitted. When the name of the feature is outputted in step S209, the process shown in the present flow chart is finished.

According to the process shown in the present flow chart, even if there is only one subordinate folder containing data that may potentially be a processing object with respect to the identified superior folder, a superior folder can be re-identified by re-executing the superior group identification process from the beginning.

Figure 13:
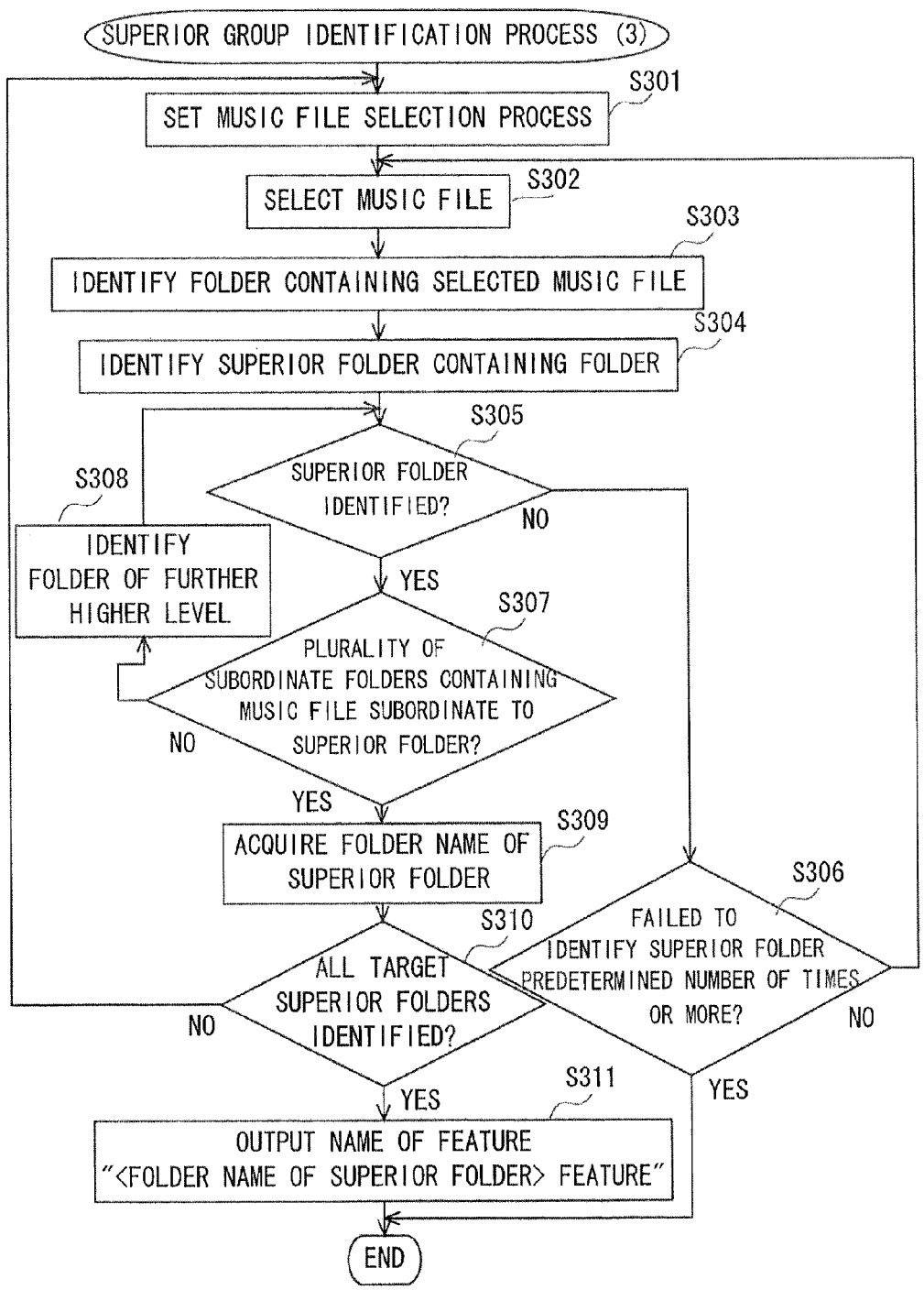
FIG. 13 is a flowchart showing an example non-limiting second variation of a superior group identification process.

FIG. 13 is a flow chart showing one example of a second variation of the superior group identification process. The process shown in the present flow chart is executed when the "Random" menu item is changed to a selected state on the screen shown in FIG. 8. However, execution of the superior group identification process may be completed before the "Feature" submenu is displayed, and a trigger for starting the superior group identification process is not limited to the "Random" menu item being changed to a selected state. For example, the superior group identification process may be executed when the music file playback/management function is activated or when activation of the game device 10 is completed. Moreover, specific contents, order, and the like of the process shown in the present flow chart represent an example of implementing the present disclosure. Specific contents, order, and the like may be appropriately selected according to the embodiment.

Since processes shown in steps S301 to S306 are approximately the same as the processes of steps S101 to S106 already described with reference to FIG. 10, a description thereof will be omitted. When it is determined that a superior folder has been identified, the process proceeds to step S307.

In steps S307 and S308, a determination is made on whether or not a superior folder having a plurality of subordinate folders containing music files (an appropriate superior folder) has been identified, and when it is determined that the identification of an appropriate superior folder has failed, a folder of a further higher level is re-identified as the superior folder. The determination unit 57 determines whether or not a superior folder having a plurality of subordinate folders containing music files has been identified by referencing contents of the subordinate folders that are subordinate to the superior folder identified in step S304 (step S307). At this point, when it is determined that an appropriate superior folder has not been identified, the superior group changing unit 58 changes (re-identifies) a superior group by retracing at least one level from the superior group identified by the superior group identifying unit 56 (step S308).

Conversely, when it is determined that an appropriate superior folder has been identified, the process proceeds to step S309. Since processes shown in steps S309 to S311 are approximately the same as the processes of steps S107 to S109 already described with reference to FIG. 10, a description thereof will be omitted. When the name of the feature is outputted in step S311, the process shown in the present flow chart is finished.

According to the process shown in the present flow chart, even if there is only one subordinate folder containing data that may potentially be a processing object with respect to the identified superior folder, a superior folder can be re-identified by identifying a folder of a level higher than the identified superior folder.

In addition, the superior group identification process described using the flow charts shown in FIGS. 10, 12, and 13 adopts a method of identifying a superior folder while using a music file selected by a predetermined process as a starting point. However, when identifying a superior folder by using, as a starting point, a file selected from a predetermined process involving, for example, selecting a file from files with high frequencies of use, superior folders presented by the "Feature" submenu may possibly become biased due to a specific file having a prominent frequency of use. Therefore, in the present embodiment, when presenting a "Feature" (for example, the "Feature 1") based on a file identified by a certain process, a "Feature" (for example, the "Feature 2") based on a file identified by a different process is presented at the same time. Furthermore, as another method of avoiding a bias of the presented superior folder, a method may be adopted in which a superior folder is identified by using a folder selected by a predetermined process as a starting point. Hereinafter, a method of identifying a superior folder by using a folder with a high frequency of use as a starting point will be described with reference to FIG. 14.

Figure 14:
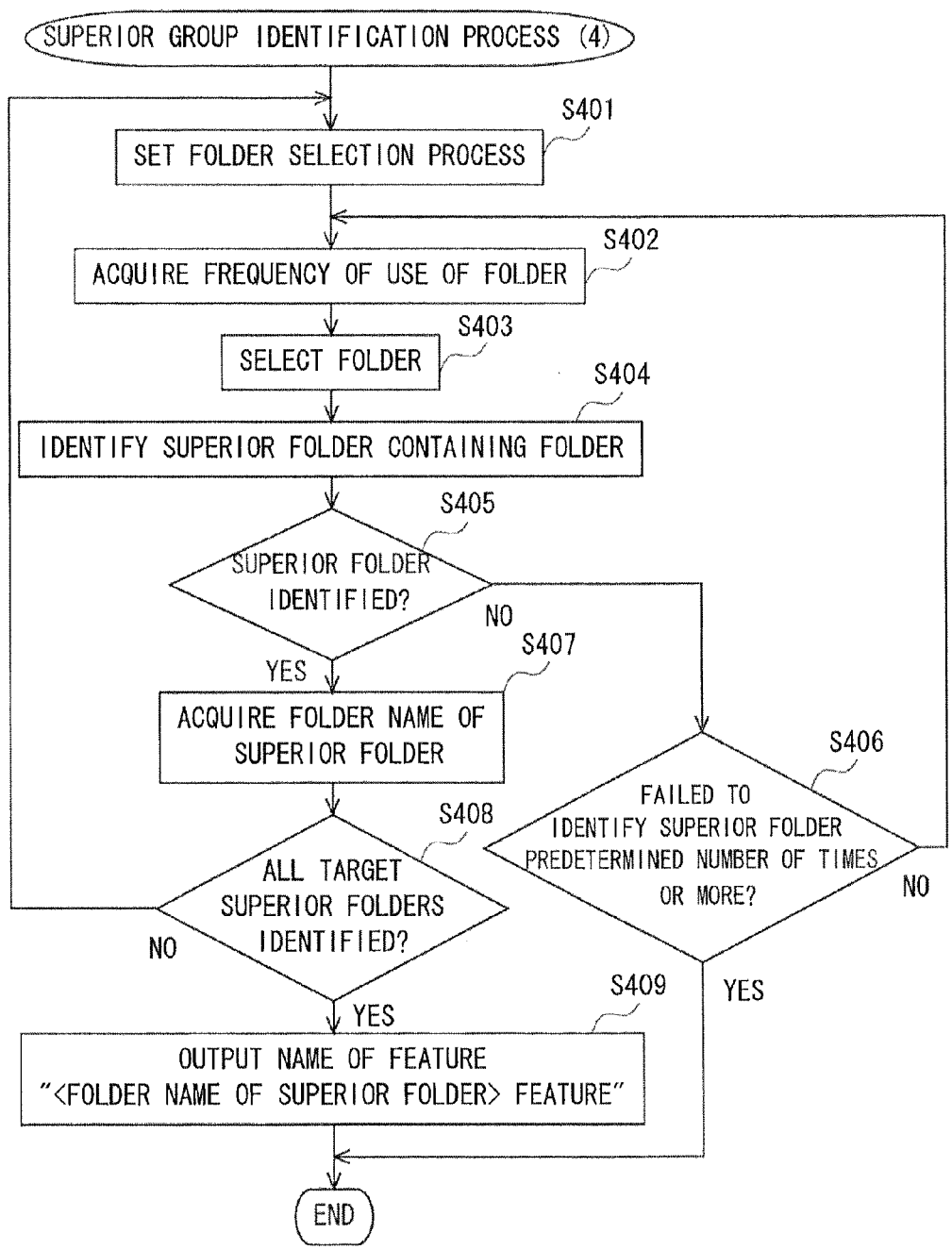
FIG. 14 is a flow chart showing an example non-limiting third variation of a superior group identification process.

FIG. 14 is a flow chart showing one example of a third variation of the superior group identification process. The process shown in the present flowchart is executed when the "Random" menu item is changed to a selected state on the screen shown in FIG. 8. However, execution of the superior group identification process may be completed before the "Feature" submenu is displayed, and a trigger for starting the superior group identification process is not limited to the "Random" menu item changed to a selected state. For example, the superior group identification process may be executed when the music file playback/management function is activated or when activation of the game device 10 is completed. Moreover, specific contents, order, and the like of the process shown in the present flow chart represent an example of implementing the present disclosure. Specific contents, order, and the like may be appropriately selected according to the embodiment.

In step S401, a process is set for selecting a folder to become a key. The group selecting unit 55 sets, in accordance with a feature to be generated, a predetermined process that is applied when a folder to become a key is selected in step S403. A feature automatically generated based on playback frequency (hereinafter, referred to as the "Feature 1") and a feature automatically randomly generated (hereinafter, referred to as the "Feature 2") are to be presented to the user.

In the present embodiment, when generating the Feature 1, the group selecting unit 55 sets a playback frequency of a folder which ranks in the top ten (this value may be appropriately set according to the embodiment) in playback frequencies as the predetermined condition and randomly selecting a folder from folders satisfying this condition as the predetermined process. In addition, when generating the Feature 2, the group selecting unit 55 sets selecting a folder from folders recorded on the external data memory 46 (in other words, all folders are objects) as the predetermined process. Subsequently, the process proceeds to step S402.

In step S402, a playback frequency of a folder is acquired. The use frequency acquiring unit 53 acquires a playback frequency of a folder by identifying a folder containing each music file from the playback history of the music file and compiling a playback history for each identified folder. More specifically, when playback history is recorded based on an accumulation of file paths of played-back music files, the use frequency acquiring unit 53 identifies a folder containing a music file related to the playback history by extracting a path to a folder for which a file name had been removed from an accumulated file path. Since a usage history of a folder is consequently acquired, the use frequency acquiring unit 53 complies the number of accumulated file paths for each folder to acquire a usage history of the folder. Subsequently, the process proceeds to step S403.

In step S403, a folder to become a key is selected. The group selecting unit 55 selects one folder to become a key of the superior group identification process from the folders recorded on the external data memory 46. In the present embodiment, when generating the Feature 1, the group selecting unit 55 selects a folder to become a key by executing a process for randomly selecting one folder from folders with playback frequencies ranking in the top 10 (this value may be appropriately set according to the embodiment) acquired in step S402 as the predetermined process. Furthermore, when generating the Feature 2, a folder to become a key is selected by executing a process for randomly selecting one folder from all folders recorded on the external data memory 46 as the predetermined process. Subsequently, the process proceeds to step S404.

Moreover, in the present embodiment, while a process for randomly selecting one folder from folders with high playback frequencies and a process for randomly selecting one folder from all folders are adopted as the predetermined process for selecting a folder to become a key, the folder to become a key may be selected by other processes. For example, a folder to become a key may be selected from a population made up of folders having titles which include a predetermined word, a population made up of folders in which a total playback time of contained music files is within a predetermined period of time, or the like. When such information cannot be acquired from the management information of a file, the information can be acquired by opening a file contained in the folder and referencing meta-information (a tag or the like) in the file or analyzing contents of actual data included in the file.

Since processes shown in steps S404 to S409 are approximately the same as the processes of steps S104 to S109 already described with reference to FIG. 10, a description thereof will be omitted. When the name of the feature is outputted in step S409, the process shown in the present flow chart is finished.

According to the process shown in the present flow chart, by identifying a superior folder while using a folder with a high frequency of use as a starting point, a problem which may occur when using a file as a starting point can be prevented in which a specific file having a prominent frequency of use biases a presentation by the "Feature" submenu item, and the "Feature" submenu item can be presented in a form more closely resembling an overall usage trend of the user.

Figure 15:
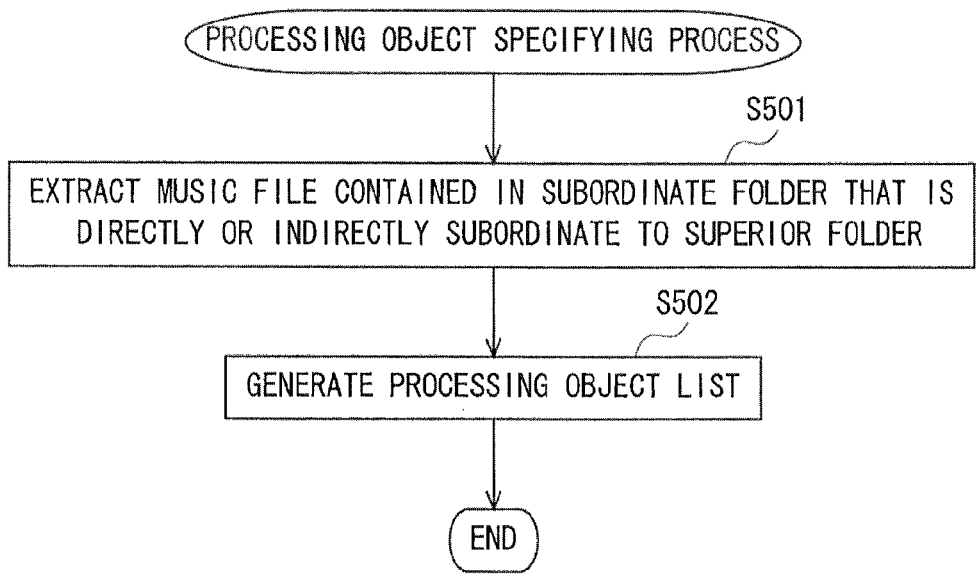
FIG. 15 is a flow chart showing an example non-limiting flow of a processing object specification process according to an embodiment.

FIG. 15 is a flow chart showing one example of a flow of a processing object specification process according to the present embodiment. The process shown in the present flow chart can be started at any time after a superior folder is identified by the superior group identification process described with reference to FIGS. 10 to 14 (in other words, after steps S104, S204, S304, and S404), and may be executed upon, for example, the conclusion of the superior group identification process or an acceptance of a playback instruction based on a user operation. Moreover, specific contents, order, and the like of the process shown in the present flowchart represent an example of implementing the present disclosure. Specific contents, order, and the like may be appropriately selected according to the embodiment.

In step S501, a music file contained in a subordinate folder is extracted. The processing object specifying unit 59 extracts a music file contained in a subordinate folder by referencing subordinate folders that are subordinate to the superior folder identified in steps S104, S204, S304, and S404 of the superior group identification process described with reference to FIGS. 10 to 14. Moreover, in addition to folders that are directly subordinate (in other words, lower by one level) to the superior folder, subordinate folders also include folders that are indirectly subordinate (in other words, lower by two or more levels) to the superior folder via other subordinate folders. In this case, a music file is extracted by acquiring positional information (a so-called file path) that indicates a position of the music file in the file system (directory structure). The processing object specifying unit 59 extracts music files from all subordinate folders that are subordinate to the superior folder. For example, in the folder structure shown in FIG. 11, when a folder of artist A is identified as the superior folder, the processing object specifying unit 59 extracts music files related to songs 01 to 05 as music files contained in the subordinate folder. Subsequently, the process proceeds to step S502.

Alternatively, when a superior group is identified using a database (a database of music file management software or the like) that manages files separately from the hierarchical structure of the folders in steps S103, S104, and the like described earlier, the processing object specifying unit 59 extracts music files contained in the subordinate group by referencing management information of the database (step S501).

In step S502, a playback object list is generated. The processing object specifying unit 59 generates a playback object list for shuffle playback by rearranging file paths of the music files extracted in step S501 in a random order (a shuffled order) that is not subjected to a sort condition such as an ascending order, a descending order, or the like. However, the shuffling (rearranging) of the order of the music files need not be performed upon the creation of the playback object list in step S502. In the shuffle playback process described later, when a playback order is determined as playback progresses, a playback object list having an order that is subjected to a certain sort condition (a playback object list that is not shuffled) may be generated in step S502. When the generation of the playback object list is completed, the process shown in the present flow chart is finished.

FIG. 16 is a diagram showing one example of a configuration of a playback object list according to the present embodiment. A playback object list according to the present embodiment is a list in which file paths of playback object music files are arranged in a playback order as identification information of the music files. In the present embodiment, since an order of shuffle playback is determined in advance, file paths of music files are also arranged shuffled in a playback object list. In addition, in a playback object list, a flag indicating whether or not a music file represented by a file path has already been played back is recorded in association with each file path.

Figure 17:
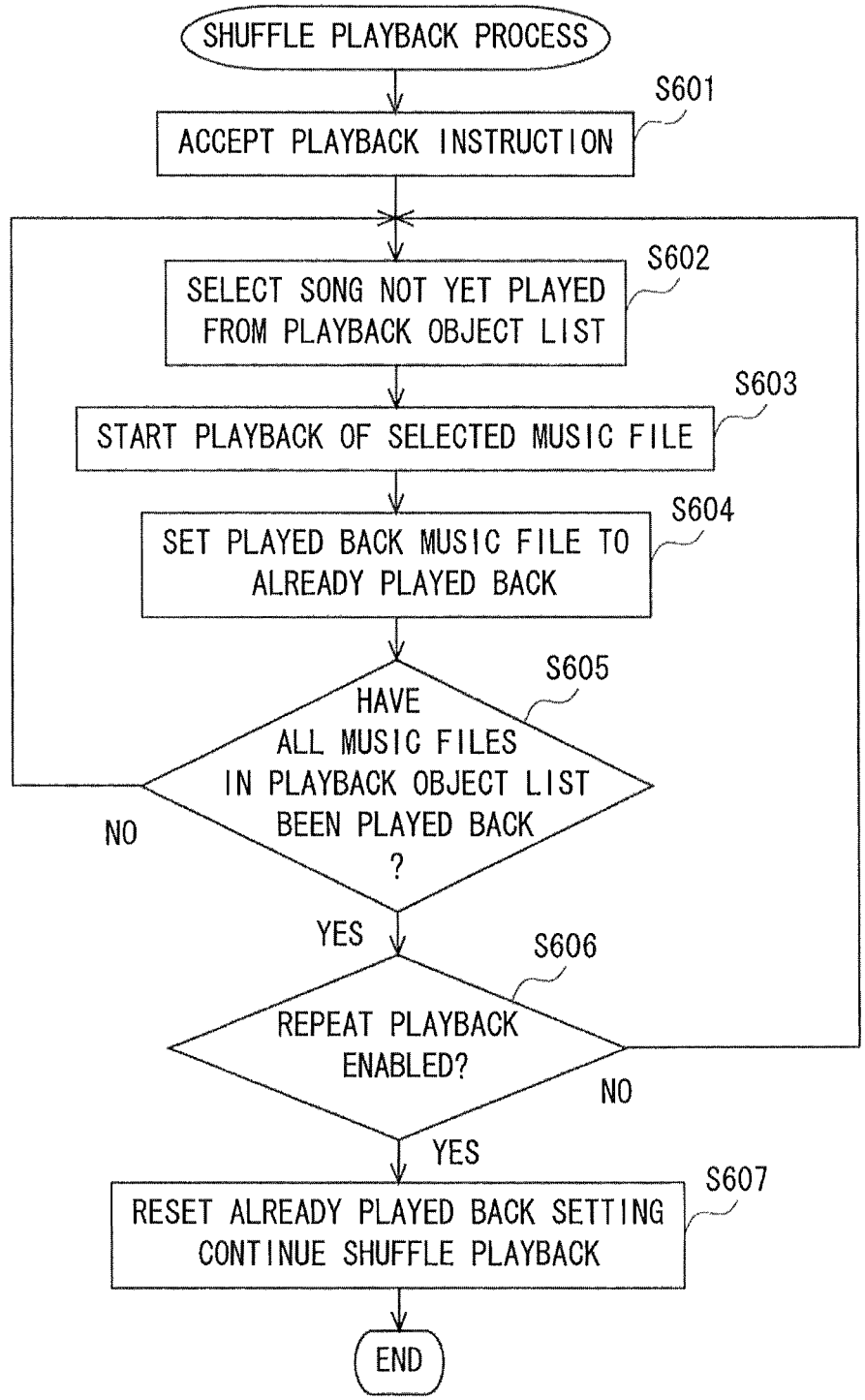
FIG. 17 is a flow chart showing an example non-limiting flow of a shuffle playback process of music files according to an embodiment.

FIG. 17 is a flow chart showing one example of a flow of a shuffle playback process of music files according to the present embodiment. The process shown in the present flow chart is executed when a playback instruction based on a user operation is accepted. Moreover, specific contents, order, and the like of the process shown in the present flow chart represent an example of implementing the present disclosure. Specific contents, order, and the like may be appropriately selected according to the embodiment.

In steps S601 and S602, a playback instruction is accepted and a music file not yet played back is selected from the playback object list. The input/output unit 51 accepts the playback instruction (step S601). The playback control unit 52 selects one music file not yet played back from the playback object list generated in step S502 of the processing object specification process (step S602). Moreover, in the present embodiment, since an order of shuffle playback is determined in advance in the playback object list, the playback control unit 52 is able to realize shuffle playback simply by selecting music files not yet played back in the playback order (the sequence in the playback object list) determined in advance. However, in an embodiment in which a playback object list is not in an order of shuffle playback, the playback control unit 52 selects a playback object music file using methods such as performing a random selection of a music file not yet played back each time a music file is selected. Subsequently, the process proceeds to step S603.

In steps S603 and S604, playback of a music file not yet played back is started and the music file that is played back is set as being already played back. The playback control unit 52 starts playback of the selected music file (step S603). Once the selected music file has been played back, the playback control unit 52 sets an already played back flag to a record of the played back music file in the playback object list. Subsequently, the process proceeds to step S605.

Moreover, a timing of setting an already played back flag may differ according to the embodiment. For example, the playback control unit 52 may set an already played back flag immediately after the start of playback of a music file or immediately after the end of playback of the music file. A timing of setting an already played back flag may be appropriately set according to the embodiment.

In addition, a music file that has already been played back may be managed by methods other than setting a flag or the like indicating that the music file has already been played back. For example, when a playback object list is a list that has been shuffled (rearranged) in advance to form a playback order for shuffle playback as is the case of the present embodiment, music files that have already been played back can be managed by simply retaining information indicating at least any of a music file that is currently being played back among the playback object list, a music file that was last played back among the playback object list, and a music file that is to be played back next among the playback object list. For example, when a music file that is currently being played back among the playback object list is displayed, music files preceding the music file in the playback object list can be determined as being already played back.

In step S605, a determination is made on whether or not all music files listed in the playback object list have already been played back. The playback control unit 52 determines whether or not all music files listed in the playback object list have already been played back by referencing already played back flags retained in the playback object list and determining whether or not already played back flags are set to all music file records. However, when music files that have already been played back are managed by a method other than already played back flags, a determination is made on whether or not all music files have already been played back by a method in accordance with the management method. For example, when a playback object list is a list that has been shuffled in advance to form a playback order for shuffle playback, a determination on whether or not all music files have already been played back can be made by simply referencing information indicating at least any of a music file that is currently being played back among the playback object list, a music file that was last played back among the playback object list, and a music file that is to be played back next among the playback object list. Once all music files have been played back, the process proceeds to S606.

Conversely, if all music files have not been played back, the process proceeds to S602. As described above, step S602 is a process for selecting a music file that is not yet played back from the playback object list. In other words, according to the process shown in the present flow chart, processes shown in steps S601 to S605 are repetitively performed until playback of all music files listed in the playback object list is completed or until receiving an end playback instruction based on a user operation or an interrupt function provided in the game device 10.

In steps S606 and S607, a determination is made on whether repeat playback is required or not, and a process for continuing playback is performed as needed. More specifically, the playback control unit 52 determines whether or not repeat playback is set to "enabled" by referencing a setting content of repeat playback that is stored in a storage device (step S606). As a result of the determination, when repeat playback is set to "disabled", the process shown in the present flow chart is finished, and where there is a music file that is being played back, playback of the feature is finished upon the end of the playback. Conversely, as a result of the determination, when repeat playback is set to "enabled", the playback control unit 52 resets stored information representing music files that have already been played back and the playback order (step S607), and the process proceeds to step S602. In this case, when music files that have already been played back are managed by means of already played back flags, resetting information representing music files that have already been played back means resetting the already played back flags. In addition, when an order of shuffle playback is determined based on a playback object list rearranged in advance, a playback object list that determines a shuffle playback order is re-created (refer to the process described with reference to step S502).

According to the present embodiment, a plurality of music files contained in different groups (folders) may be set as objects of shuffle playback across groups. In addition, according to the present embodiment, the Feature 1 that is automatically generated based on playback frequency and the Feature 2 that is automatically randomly generated are presented to the user. Therefore, a combination of shuffle playback accommodating preferences of the user and shuffle playback that is unpredictable can be presented to the user in order to provide the user with more ways to enjoy contents.

Moreover, while an example of applying the present disclosure to a device that manages and plays back music files has been described in the embodiment above, types of data to which the present disclosure can be applied are not limited to music files. For example, the present disclosure can be applied to a computer that manages video files, image files, documents, and the like. For example, the present disclosure can be applied to a computer having a function for managing image files of photographs. In this case, if a folder structure is adopted in which superior folders of respective months in which photographs were taken contain folders of respective days on which the photographs were taken, by applying the present disclosure, objects of playback by means of a slideshow or the like can be set to photographs taken in a same month in which a photograph of an image file selected by a predetermined process had been taken.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable medium on which a program is recorded for use with a computer that manages groups of data by using a hierarchically-structured file system with a tree structure, the tree structure including a predetermined group, a superior group, and another subordinate group, the predetermined group and the another subordinate group being different groups that are both subordinate to the superior group within the tree structure, the program comprising instructions causing the computer to execute:

identifying the superior group from the predetermined group managed by the tree structure by retracing the tree structure by at least one level;

based on identification of the superior group, automatically specifying, as a plurality of playback objects, a plurality of data among all data belonging to the predetermined group and at least the another subordinate group that is subordinate to the superior group in the tree structure where the plurality of data is specified based on being included in a group that is subordinate to the superior group;

automatically generating a playback list from the specified plurality of playback objects; and executing at least one application program by successively using at least some of the plurality of playback objects based on inclusion of the plurality of objects in the playback list, wherein the program causes the computer to further execute determining whether or not there is a plurality of the subordinate groups which contains a predetermined type of data and which is subordinate to the superior group.

2. The non-transitory computer-readable medium on which a program is recorded according to claim 1, the program causing the computer to further execute selecting data by a predetermined process, wherein in the superior group identifying, the superior group is identified by identifying a superior group that is higher by at least one level from a group containing the data selected in the data selecting.

3. The non-transitory computer-readable medium on which a program is recorded according to claim 2, wherein in the data selecting, data is selected by a process of selecting data from data satisfying a predetermined condition.

4. The non-transitory computer-readable medium on which a program is recorded according to claim 3, wherein in the data selecting, data is selected by a process of selecting data from data satisfying the predetermined condition that includes a condition regarding a frequency of use of data.

5. The non-transitory computer-readable medium on which a program is recorded according to claim 4, wherein in the data selecting, data is selected by a process of selecting data from data satisfying the predetermined condition that includes a condition requiring a frequency of use of data to be within a predetermined rank from a highest rank.

6. The non-transitory computer-readable medium on which a program is recorded according to claim 2, wherein:

in the data selecting, a plurality of pieces of data is selected by a plurality of predetermined processes differing from each other;

in the superior group identifying, a plurality of the superior groups is identified for each of the plurality of pieces of data selected in the data selecting; and the computer is caused to further execute displaying group names of the plurality of superior groups identified in the superior group identifying on a display device connected to the computer so as to be selectable by a user.

7. The non-transitory computer-readable medium on which a program is recorded according to claim 6, wherein in the data selecting, a plurality of pieces of data is selected including data selected by a process of selecting data from data satisfying a predetermined condition, and data selected by a process of selecting data from all pieces of data.

8. The non-transitory computer-readable medium on which a program is recorded according to claim 1, the program causing the computer to further execute selecting a group by a predetermined process, wherein in the superior group identifying, the superior group is identified by identifying a superior group that is higher by at least one level from the group selected in the group selecting.

9. The non-transitory computer-readable medium on which a program is recorded according to claim 8, wherein in the group selecting, a group is selected by a process of selecting a group from groups that satisfy a predetermined condition.

10. The non-transitory computer-readable medium on which a program is recorded according to claim 9, wherein in the group selecting, a group is selected by a process of selecting a group from groups satisfying the predetermined condition that includes a condition regarding a frequency of use of a group.

11. The non-transitory computer-readable medium on which a program is recorded according to claim 10,
the program causing the computer to further execute acquiring a frequency of use of a group by identifying a group containing each piece of data indicated in a data usage history of the computer and compiling the usage history for each identified group, wherein
in the group selecting, a group is selected by a process of selecting a group from groups satisfying the predetermined condition including a condition regarding the frequency of use of group acquired in the use frequency acquiring.

12. The non-transitory computer-readable medium on which a program is recorded according to claim 1, wherein
the program causes the computer to change the predetermined group and re-execute the superior group identifying and the playback objects specifying when it is determined in the determination that there is not a plurality of the subordinate groups.

13. The non-transitory computer-readable medium on which a program is recorded according to claim 1, wherein
the program causes the computer to further execute changing the superior group by further retracing from the superior group identified in the superior group identifying by at least one level when it is determined in the determination that there is not a plurality of the subordinate groups.

14. The non-transitory computer-readable medium of claim 1, wherein the predetermined group, the superior group, and another subordinate group are folders within the hierarchically-structured file system.

15. The non-transitory computer-readable medium of claim 1, wherein each one of the plurality of data is a file that is managed as part of the hierarchically-structured file system.

16. The non-transitory computer-readable medium of claim 1, where each file is a music file.

17. An information processing device which manages groups of data by using a hierarchically-structured file system with a tree structure, the tree structure including a first group, a superior group, and another subordinate group, the first group and the another subordinate group being different groups that are among a plurality of subordinate groups that are subordinate to the superior group within the tree structure, the information processing device comprising:
a processing system that includes at least one processing circuit coupled to a memory device, the processing system configured to:
identify the superior group from the first group managed by the tree structure by retracing the tree structure by at least one level;
determine whether or not there are at least two subordinate groups of the plurality of subordinate groups that contain a predetermined type of data;
based on identification of the superior group, automatically specify, as a plurality of playback objects, a plurality of data among all data belonging to the first group and at least the another subordinate group that is subordinate to the identified superior group in the tree structure, wherein the plurality of data is specified based on being included in a group of the tree structure of the hierarchically-structured file system that is subordinate to the identified superior group;
automatically generating a playback list from the specified plurality of playback objects; and
execute at least one application program by successively using at least some of the plurality of playback objects based on inclusion of the plurality of objects in the automatically generated playback list.

18. An information processing system which manages groups of data, the information processing system comprising:
a storage device configured to store the groups of data in a hierarchically-structured file system with a tree structure, the groups of data contained in at least a first group and a second group that are both subordinate to a superior group in the tree structure; and
a processing system that includes at least one processor that is coupled to the storage device, the processing system configured to:
identify the superior group from the first group managed by the tree structure by retracing the tree structure by at least one level from the first group;
determine whether or not there are a plurality of groups that contain a predetermined data type and are also subordinate to the superior group;
based on identification of the superior group and the first group and the second group being subordinate to the superior group, automatically select, as a plurality of playback objects, a plurality of data among all data belonging to the first group and the second group that is subordinate to the identified superior group in the tree structure, wherein the plurality of data are selected based on being included in a group of the tree structure of the hierarchically-structured file system that is subordinate to the identified superior group;
automatically generate a playback list based on the selected plurality of playback objects; and
execute at least one application program by successively using at least some of the plurality of playback objects based on inclusion of the plurality of objects in the playback list.

19. An information processing method for use with a computer that manages groups of data by using a hierarchically-structured file system with a tree structure, the tree structure including a predetermined group, a superior group, and another subordinate group, the predetermined group and the another subordinate group being different groups that are both subordinate to the superior group within the tree structure, the method comprising:
identifying, via at least one processor, the superior group from the predetermined group managed by the tree structure by retracing the tree structure by at least one level;
determining whether or not there are a plurality of groups that contain a predetermined data type and are also subordinate to the superior group;
based on identification of the superior group, automatically specifying, via at least one processor, a plurality of data among all data belonging to the predetermined group and at least another group that is subordinate to the superior group in the tree structure as a plurality of playback objects, wherein the plurality of data are specified based on being included in a group of the tree structure of the hierarchically-structured file system that is subordinate to the superior group;
automatically generating, via at least one processor, a playback list from the specified plurality of playback objects; and
executing at least one application program by successively using at least some of the plurality of playback objects based on inclusion of the plurality of objects in the playback list.

* * * * *